US009161272B2

(12) United States Patent
Ofir et al.

(10) Patent No.: US 9,161,272 B2
(45) Date of Patent: Oct. 13, 2015

(54) METHOD AND APPARATUS TO ACHIEVE LOSSLESS CALL IN VIEW OF A TEMPORARY RECEPTION ISSUE

(71) Applicant: MOTOROLA SOLUTIONS, INC, Schaumburg, IL (US)

(72) Inventors: Gabi Ofir, Reshon Letzion (IL); David Bar-On, Rehovot (IL); Uri Cohen, Ramat Gan (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 71 days.

(21) Appl. No.: 14/061,904

(22) Filed: Oct. 24, 2013

(65) Prior Publication Data

US 2015/0117397 A1    Apr. 30, 2015

(51) Int. Cl.
| | |
|---|---|
| *H04W 4/00* | (2009.01) |
| *H04W 36/02* | (2009.01) |
| *H04L 29/06* | (2006.01) |
| *H04L 29/14* | (2006.01) |

(52) U.S. Cl.
CPC ............. *H04W 36/023* (2013.01); *H04L 65/60* (2013.01); *H04L 65/80* (2013.01); *H04L 69/40* (2013.01)

(58) Field of Classification Search
CPC ......................... H04M 1/6505; H04L 43/0829
See application file for complete search history.

(56) References Cited

U.S. PATENT DOCUMENTS

| | | | |
|---|---|---|---|
| 5,802,076 | A | 9/1998 | Weigand et al. |
| 7,003,286 | B2 | 2/2006 | Brown et al. |
| 7,395,481 | B2 * | 7/2008 | Chintada et al. ............... 714/749 |
| 7,809,388 | B1 * | 10/2010 | Othmer ........................ 455/518 |
| 7,970,385 | B1 | 6/2011 | Satapathy |
| 8,406,801 | B1 | 3/2013 | Othmer |
| 2007/0291744 | A1 | 12/2007 | Lundberg et al. |
| 2010/0034363 | A1 | 2/2010 | O'Connell et al. |
| 2010/0150320 | A1 | 6/2010 | Lingafelt et al. |
| 2013/0171975 | A1 | 7/2013 | Lindner et al. |

FOREIGN PATENT DOCUMENTS

| | | |
|---|---|---|
| GB | 2483279 A | 3/2012 |
| WO | WO 96-09700 A1 | 3/1996 |
| WO | WO 2007-084838 A2 | 7/2007 |

OTHER PUBLICATIONS

PCT International Search Report Dated Jan. 14, 2015 for Counterpart Application PCT/US2014/060365.

* cited by examiner

*Primary Examiner* — Maharishi Khirodhar
(74) *Attorney, Agent, or Firm* — Daniel R. Bestor

(57) ABSTRACT

A lossless call may be established over a wireless radio network by determining, at a target subscriber device during a received call, that one or more identified media items in a stream of media items of the call being received over a first radio channel was not successfully received, and responsively: continuing to receive first subsequent media items of the call and buffering, instead of rendering at the target subscriber device, the first subsequent media items, requesting the identified media items, receiving by the target subscriber device via an established second radio channel, different from the first radio channel, the identified media items, re-ordering the identified media items chronologically with respect to the buffered first subsequent media items to create the re-ordered subsequent media stream, and rendering, by the target subscriber device, the re-ordered subsequent media stream at a first increased relative rate.

17 Claims, 9 Drawing Sheets

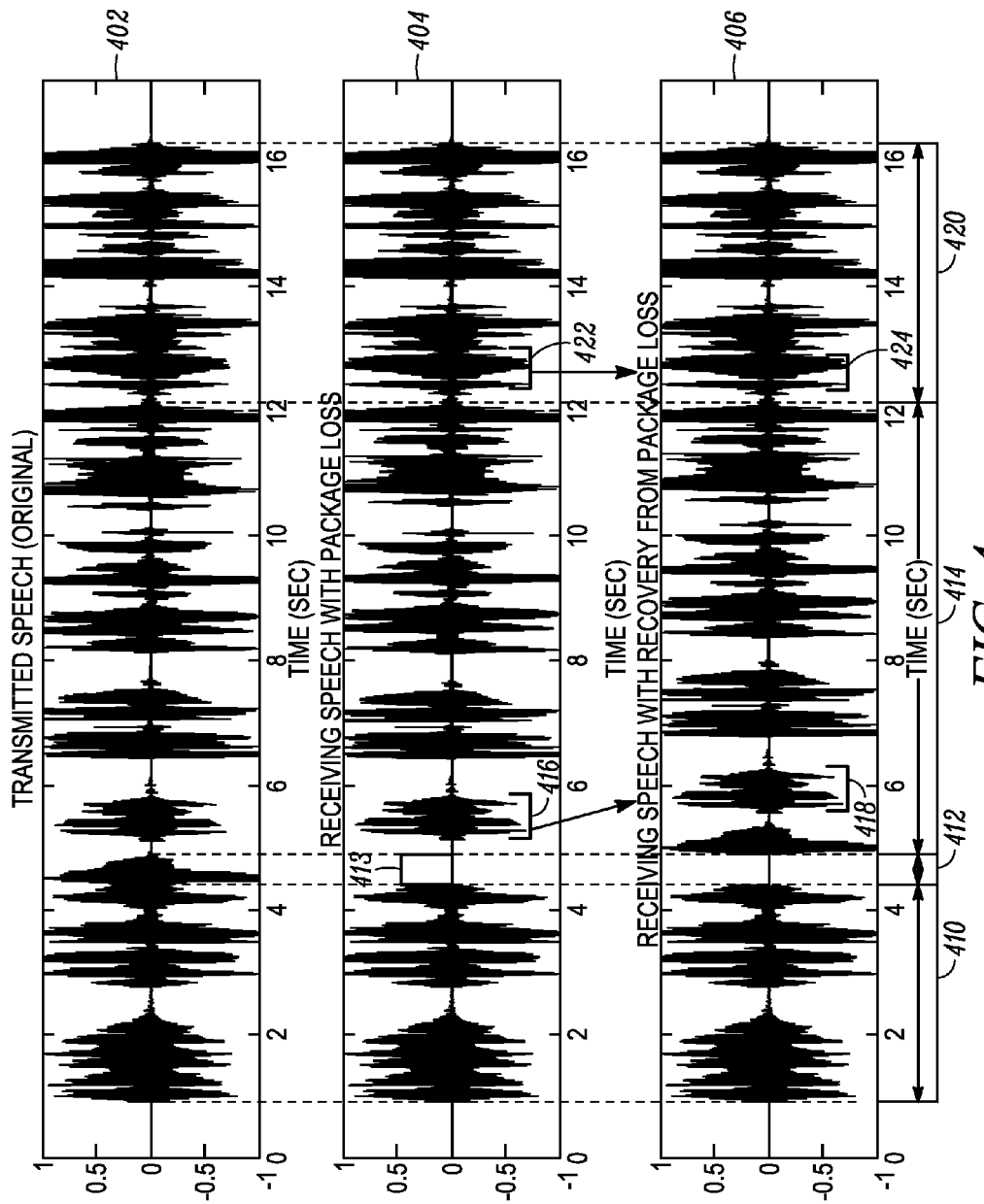

METHOD AND APPARATUS TO ACHIEVE LOSSLESS CALL IN VIEW OF A TEMPORARY RECEPTION ISSUE

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure which generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive media items (encoded portions of voice, audio, video, and/or audio/video streams) in accordance with the designated protocol.

OMA-PoC, in particular, enables familiar PTT and "instant on" features of traditional half duplex subscriber devices, but uses mobile subscriber devices operating over modern cellular telecommunications networks. Using PoC, wireless subscriber devices such as mobile telephones and notebook computers can function as PTT half-duplex subscriber devices for transmitting and receiving auditory data. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to transmit in the OMA-PoC session is transmitted from the user's subscriber device to the PTT server using, for example, a real-time transport protocol (RTP) message. If no other users are currently transmitting in the PoC session, an acceptance message is transmitted back to the user's subscriber device and the user can then begin transmitting captured media (e.g., audio or voice captured via a microphone of the device and/or encoded video captured via an imaging device integrated with or wired or wirelessly coupled to the device). Using standard compression/decompression (codec) techniques, the captured media is digitized, encoded, and transmitted using discrete data packets (e.g., media items that together form a media stream over time), such as according to RTP and internet protocols (IP), to the PTT server. The PTT server then transmits the media items to other users of the PoC session (e.g., to other subscriber devices in the group of subscriber devices or talkgroup to which the user is subscribed), using for example a unicast, multicast (point to multipoint), or broadcast communication technique.

Narrowband LMR systems, on the other hand, operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Individual (e.g., one to one) or group (e.g., one to many) calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen for individual and group calls is that a target radio of the individual or group call may miss one or more media items in a stream of media items transmitted over a radio link due to any number of factors including the target radio temporarily going out of range, the appearance of a temporary interferer within the range of the target radio or the base station serving the target radio, a handover or cell reselection process, a geographic feature such as a building, hill, or tunnel temporarily blocking communications between the target radio and its serving base station, or user action at the target radio such as the swapping out of batteries. During periods of time in which no media items in the media stream are received, conventional radios may render audio and/or video static, mute themselves, and/or blank the screen, or take some other action which, in any event, produces a media hole in which the audio and/or video intended to be transmitted to and rendered at the target radio is simply never rendered at the target radio. Instead, the target radio simply waits until the temporary reception issue is resolved and begins receiving and rendering subsequent media items in the stream of media items once they are again received. Situations may arise, however, where the missed media items are critical communications that may lead to undesired consequences if not accurately rendered in their entirety. For example, a situation may arise where a dispatcher or incident scene commander transmits a voice instruction instructing first responders "not to enter the building and seek survivors," perhaps due to known structural issues with the building's roof If, due to one of the situations noted above, a target radio of the communication receives everything in the media stream except the word "not," the entire context of the media changes and undesired consequences may result.

Of course, if one of the temporary situations noted above extends over a longer period of time and in fact becomes not so temporary in nature, the established radio channel between the target radio and its serving base station link (e.g., the primary channel over which the call is being received) will simply be dropped, and an indication of the failure indicated to the target user via a display or audio indication. This disclosure, accordingly, is directed to those occurrences in which the temporary situation noted above occurs over a short enough period of time to prevent the link from being dropped, but over a long enough time to cause media holes that could lead to one or more potential undesired consequences. For example, the present disclosure is directed to solving media holes having a duration of under ten seconds, or under five seconds.

Accordingly, what is needed is an improved method and apparatus for achieving lossless calls when one or more media items in a stream of media items are not received at a target radio due to a temporary reception issue.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A-4C are waveform diagrams illustrating the differences between a source speech waveform generated at a source subscriber device, a speech waveform rendered at a conventional subscriber device due to an audio hole, and an adjusted speech waveform rendered at a subscriber device due to an audio hole in accordance with an embodiment.

Figure 1:
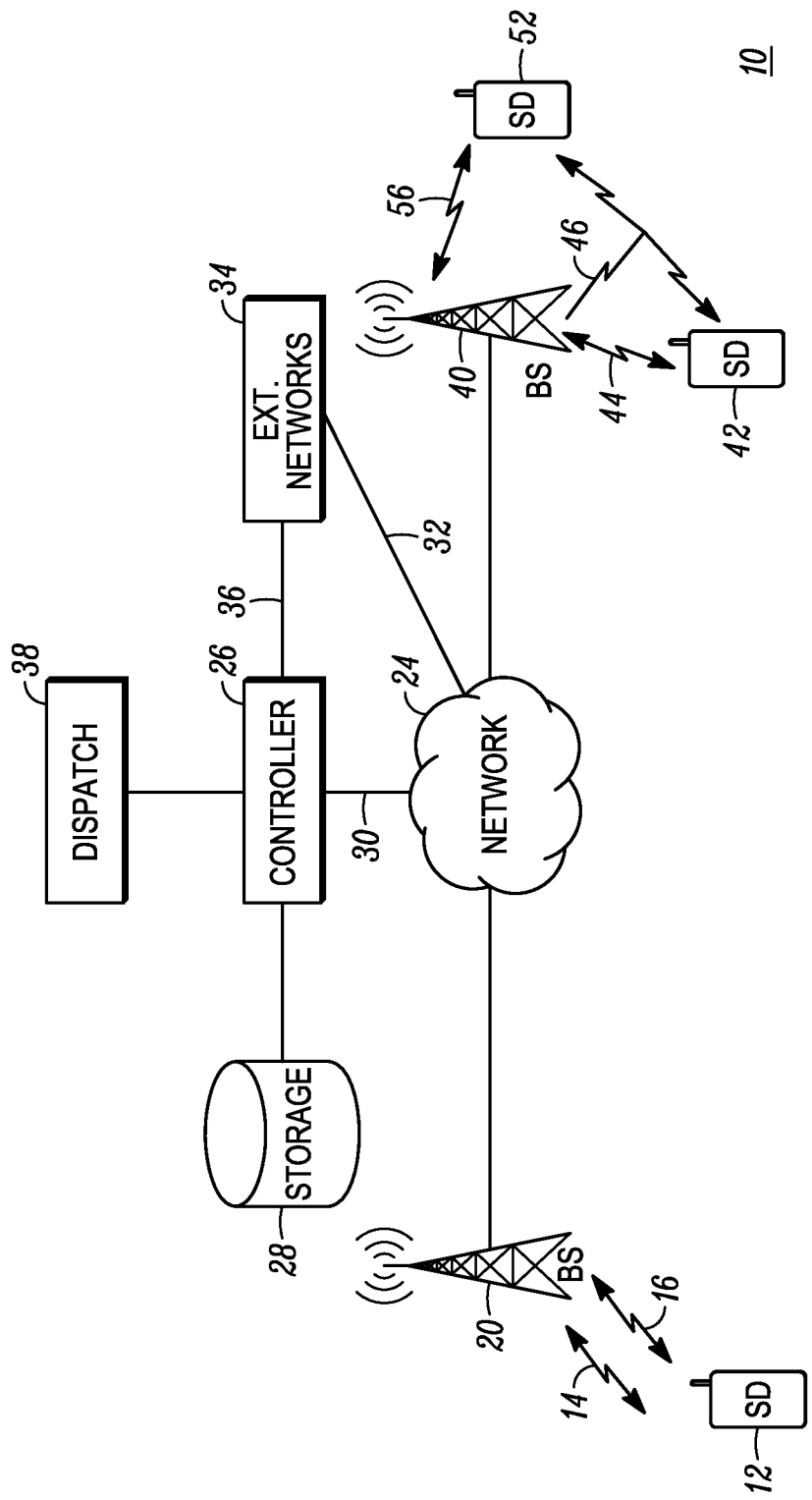
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for achieving lossless calls when one or more media items in a stream of media items are not received at a target subscriber device.

In one embodiment, a lossless call over a wireless radio network may be established. A target subscriber device determines during a received call that one or more identified media items in a stream of media items of the call being received over a first radio channel was not successfully received. Responsively, one of an infrastructure controller and the target subscriber device via the first radio channel continue to receive first subsequent media items of the call and buffer, instead of render at the target subscriber device, the first subsequent media items. The target subscriber device requests the identified media items. The target subscriber device receives, via a second radio channel, different from the first radio channel and established at the time of the call or responsive to the determining that the one or more identified media items was not successfully received, one of the identified media items and a re-ordered subsequent media stream. One of the target subscriber device and the infrastructure controller re-order the identified media items chronologically with respect to the buffered first subsequent media items to create the re-ordered subsequent media stream. The target subscriber device renders the re-ordered subsequent media stream at a first increased relative rate. The target subscriber device subsequently receives, via the first radio channel, second subsequent media items of the call over the first radio channel and renders the second subsequent media items at a nominal rate lower than the first increased relative rate.

In another embodiment, a lossless call over a wireless radio network may be established at a target subscriber device. The target subscriber device comprises one or more transceivers, one of a speaker and display, a data store; and one or more processors. The one or more processor may be configured to: determine, during a received call, that one or more identified media items in a stream of media items of the call being received over a first radio channel via the one or more transceivers was not successfully received, and responsively: continue to receive, via the first radio channel and the one or more transceivers, first subsequent media items of the call and buffer via the data store, instead of render via the one of the speaker and display, the first subsequent media items, requesting, via the one or more transceivers, the identified media items, receive, via the one or more transceivers and a second radio channel, different from the first radio channel and established at the time of the call or responsive to the determining that the one or more identified media items was not successfully received, the identified media items, retrieve the buffered first subsequent media items via the data store and re-order the identified media items chronologically with respect to the buffered first subsequent media items to create a re-ordered subsequent media stream, and render, via the one of the speaker and display, the re-ordered subsequent media stream at a first increased relative rate, and subsequently receive, via the first radio channel, second subsequent media items of the call over the first radio channel via the one or more transceivers and render, via the one of the speaker and display, the second subsequent media items at a nominal rate lower than the first increased relative rate.

In a still further embodiment, a lossless call over a wireless radio network may be established. An infrastructure controller receives, during a call, a missed media items request from a first target subscriber device indicating one or more identified media items in a stream of media items of the call being provided over a first radio channel was not successfully received at the first target subscriber device, and the infrastructure controller responsively: continues to receive first subsequent media items of the call from a source device and buffer at the infrastructure controller, instead of rendering at the target subscriber device, the first subsequent media items, retrieves from storage the identified media items identified in the missed media items request, re-orders the identified media items chronologically with respect to the buffered first subsequent media items to create a re-ordered subsequent media stream; and transmits via a second radio channel, different from the first radio channel and established at the time of the call or on demand to provide the one or more identified media items, the re-ordered subsequent media stream, subsequently provides, via the first radio channel to the first target subscriber device, second subsequent media items of the call over the first radio channel.

Each of the above-mentioned embodiments will be discussed in more detail below, starting with example network and device architectures of the system in which the embodiments may be practiced, followed by an illustration of processing steps and message transmissions for achieving lossless calls from a system perspective. Further advantages and features consistent with this disclosure will be set forth in the following detailed description, with reference to the figures.

1. Network Architecture And Device Structure

FIG. 1 illustrates a communications network 10 including client subscriber devices (e.g., SDs) 12, 42, 52, fixed terminals 20, 40 (e.g. base stations (BSs)), wireless links 14, 16, 44, 46, 56, backhaul network 24, controller 26, storage 28, communications connections 30, 32, 36, dispatch console 38, and external networks 34. Each BS 20, 40 has at least two radio transmitters covering a radio coverage cell (not shown). One or several SDs 12, 42, 52 within radio coverage of the BSs may connect to the BSs using a wireless communication protocol via wireless links 14, 16, 44, 46, 56. The SDs 12, 42, 52 may communicate with each other, and perhaps other devices accessible via other network links, using a group communications protocol over the wireless links 14, 16, 44, 46, 56. Each link 14, 16, 44, 46, 56 may comprise one or both of an uplink channel and a downlink channel, and may comprise one or more physical channels or logical channels. Wireless links 14, 16, 44, 46, 56 may implement, for example, a standard or protocol such as GPRS or UMTS, 2G (e.g. GSM), 3G (e.g. WCDMA or LTE), 4G (WiMAX or LTE), iDEN, wireless LAN (WLAN), ETSI Digital Mobile Radio (DMR), Project 25 (P25) standard defined by the Association of Public Safety Communications Officials International (APCO), or other radio protocols or standards. Communications system 10 may implement, in one embodiment, a narrow-band trunked radio communication system in which SDs 12, 42, 52 transmit control and media items in accordance with an air interface protocol such as that defined by the DMR or APCO P25 standards. Other types of conventional or trunked protocols could be implemented as well. In another embodiment, communications system 10 may implement an OMA-PoC or PoIP broadband architecture in which SDs 12, 42, 52 transmit control and media streams in accordance with a protocol such as RTP and/or SIP. Other types of broadband protocols could be implemented as well.

In the example of FIG. 1, the wireless link 14 is a primary wireless link established between SD 12 and BS 20 for transmission of a SD 12 sourced call including a plurality of media items (e.g., formatted bursts, packets, or messages with payloads of voice, audio, video, and/or audio/video) to one or more target devices, perhaps belonging to a same subscribed group of SDs as the source SD 12.

Wireless link 14 may be half duplex or full duplex, and may include a unicast, multicast, or broadcast uplink channel for transmitting a call to surrounding SDs (not shown) that are partied to the call and to the serving BS 20.

Wireless link 16 is a secondary wireless link established at substantially the same time as wireless link 14, or sometime thereafter on an as-needed basis, for fulfilling missing media item requests from target SDs of the call. Wireless link 16 may be half duplex or full duplex and may include a unicast, multicast, or broadcast downlink channel for receiving missing media item requests, and a unicast, multicast, or broadcast uplink channel for transmitting the requested missing media items.

Wireless link 46 is a primary wireless link between BS 40 and SDs 42 and 52, may be a half duplex or full duplex link, and may include a broadcast or multicast downlink channel for forwarding the call received from SD 12 to the target SDs 42 and 52, and any other SDs (not shown) interested in or subscribed to the call.

Wireless links 44 and 56 are secondary wireless links established at substantially the same time as wireless link 46, or sometime thereafter on an as-needed basis, may be a half duplex or a full duplex link, and may include a unicast uplink channel for transmitting missing media item requests from target SDs towards one of source SD 12 or controller 26. In some embodiments, separate secondary wireless links 44, 56 may be established for each target SD, and in other embodiments, a single random access secondary wireless link 44, 56 shared by target SDs at a site may be established. In the latter case, a carrier sense mechanism may be used to determine if the shared link is in use before transmitting on the shared link. Other types of shared links could be used as well.

Other types of wireless links and communications system architectures are possible as well. For example, in some embodiments a call directed to one or more SDs 42, 52 may be sourced via external networks 34, instead of SD 12, eliminating any need for establishing wireless links 14, 16 in the communication network 10. Other examples exist as well.

The SDs 12, 42, 52 may be configured with an identification reference (such as an International Mobile Subscriber Identity (IMSI) or MAC address) which may be connected to a physical media (such as a Subscriber Identity Module (SIM) card). Each SD 12, 42, 52 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 10 allows a single SD, such as SD 12, to communicate with one or more members (such as SDs 42, 52) associated with a particular group of SDs at the same time. In the example set forth in FIG. 1, SDs 12, 42, and 52 are members of a first group identified as G_A.

Although only one group of three SDs and two BSs are illustrated in FIG. 1, the present disclosure is not limited as such, and more or fewer groups, SDs, and BSs could be used in any particular implementation. Furthermore, while a single controller 26 is illustrated in FIG. 1, more than one controller 26 may be used and/or a distributed controller 26 may be used that divides functions across multiple devices, perhaps for load balancing reasons. Finally, while storage 28 is illustrated as directly coupled to controller 26, storage 28 may also be remote from controller 26 and accessible to controller 26 via one or more of network 24 and/or external networks 34.

The BSs 20, 40 may be linked to the controller 26 and each other via one or both of network 24 and communications connection 30. Network 24 may comprise one or more BSs, routers, switches, LANs, WLANs, WANs, access points, or other network infrastructure. For example, controller 26 may be accessible to BSs 20, 40 via a dedicated wireline or via the Internet. In one example, BSs 20, 40 may be directly coupled to controller 26 via one or more internal links under control of a single communications network provider. Network 24 may further include a call controller, PTT server, zone controller, mobile management entity (MME), base station controller (BSC), mobile switching center (MSC), site controller, Push-to-Talk controller, or other network device for controlling and distributing media streams and media items amongst SDs via respective BSs.

Controller 26 may be a separate device in the infrastructure of the communications network 10 configured to aid in achieving lossless calls between SDs. For example, and in one embodiment, the (infrastructure) controller 26 may be configured to store (perhaps via storage 28) copies of media items containing media streams being transmitted between SDs in the communications network 10, and to subsequently respond to requests to fulfill missing media items from target SDs. As noted above, controller 26 functions may be coupled with or included in other devices in the network 24, in which case controller 26 may be a zone controller PTT server, or the like.

Media items containing encoded portions of media streams may be provided to the controller 26 for storage via communications connection 30. In other embodiments, controller 26 may be embodied within or coupled to another network device, such as a call controller, PTT server, zone controller, MME, BSC, MSC, site controller, Push-to-Talk controller, or other network device, existing in network 24 or elsewhere, in which case media streams containing media items could be provided to the controller 26 via the another network device for storage and request fulfillment. The term "media item" is not intended to be limited to voice communications, but rather, to embody all possible digitized audio/visual payloads, including but not limited to, voice, audio, video, and/or audio/video streams.

Storage 28 may function to store media items along with various mappings that identify a source of the media items and, if not already included in the media items when stored, a particular chronological identifier, such as a packet identifier or time stamp that uniquely identifies each stored media item. The stored media items and/or mapping(s) can then be used by the controller 26, in one embodiment, to fulfill requests for missing media items, and/or direct a request for a missing media item to a corresponding source SD for fulfillment.

The one-to-many group communication structure may be implemented in communications network 10 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof External networks 34 may also be accessible to BSs 20, 40 (and thus SDs 12, 42, 52) via network 24 and communications connection 32 and/or controller 26 and communications connections 30, 36. External networks 34 may include, for example, a public switched telephone network (PSTN), the Internet, or another wireless service provider's network, among other possibilities.

Dispatch console 38 may be directly coupled to controller 26 as shown, or may be indirectly coupled to controller 26 via one or more of network 24 and external networks 34, or some other network device such as a radio controller in network 24. The dispatch console 38 may provide an administrative or dispatch access to SDs 12, 42, 52 and controller 26, and allow an administrator or dispatcher to initiate infrastructure-sourced group communications to groups of SDs 12, 42, 52, including the storage and fulfillment of missing media item functions provided by controller 26, among other features and functions.

Figure 2:
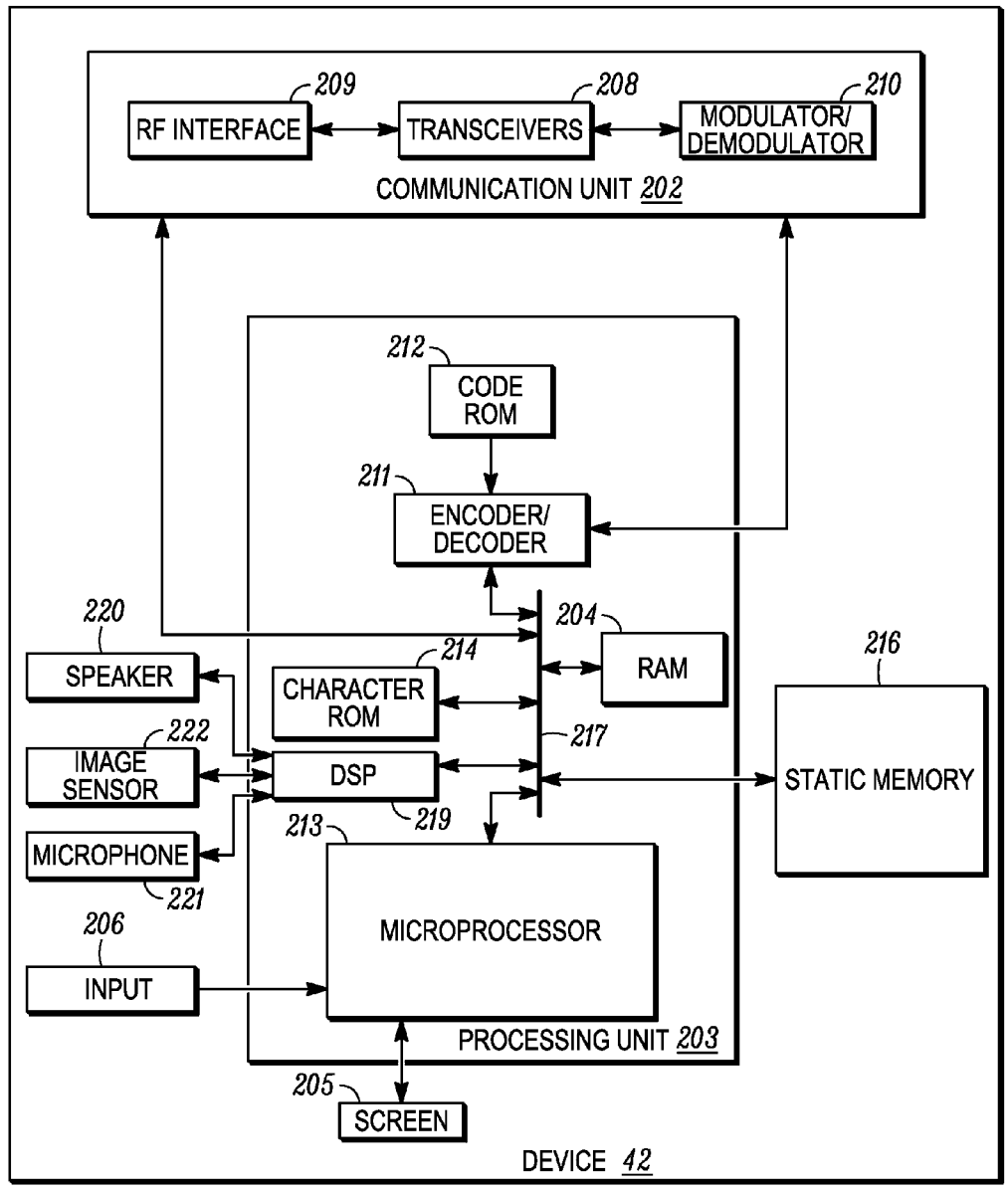
FIG. 2 is a block diagram of a subscriber device in accordance with some embodiments.

Referring to FIG. 2, a block diagram illustrates a SD 42 used in accordance with some embodiments. The other SDs 12, 52 may have a same or similar structure. As set forth in FIG. 2, the SD 42 includes a communications unit 202 coupled to a common data and address bus 217 of a processing unit 203. The SD 42 may also include an input unit (e.g., keypad, pointing device, etc.) 206 and a display screen 205, each coupled to be in communication with the processing unit 203.

The processing unit 203 may include an encoder/decoder 211 with an associated code ROM 212 for storing data for encoding and decoding voice, audio, video, audio/video, data, control, or other signals that may be transmitted or received by the SD 42. The processing unit 203 may further include a microprocessor 213 coupled, by the common data and address bus 217, to the encoder/decoder 211, a character ROM 214, a RAM 204, and a static memory 216. The processing unit 203 may also have access to a media item store, perhaps stored in one or more of RAM 204 and static memory 216, for storing media items and/or media item mappings, and for responding to requests for missing media items from target SDs.

The processing unit 203 may also include a digital signal processor (DSP) 219, coupled to the common data and address bus 217, for operating on media streams received from one or more SDs, microphone 221, image sensor 222, or static memory 216. For those encrypted incoming media streams, the streams may be decrypted prior to being provided to the DSP 219.

The communications unit 202 may include an RF interface 209 configurable to communicate with network components (for example, a call controller, database, or dispatch console), and other user equipment (for example, other SDs) via its serving BS. The communications unit 202 may include one or more broadband and/or narrowband transceivers 208, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications.

The transceivers 208 may be coupled to a combined modulator/demodulator 210 that is coupled to the encoder/decoder 211. The character ROM 214 stores code for decoding or encoding data such as control, request, instruction messages, and/or media items of media streams that may be transmitted or received by the SD 42. Static memory 216 may store operating code that, when executed by microprocessor 213, performs one or more of the processing steps and/or message transmissions and/or receptions set forth in FIGS. 3A-3B, 5A-5B, and 6A-6B.

2. Processes For Achieving Lossless Calls

FIGS. 3A-3B, 5A-5B, and 6A-6B set forth respective timing diagrams 300, 500, and 600 illustrating examples in a communications network, such as communications network 10 of FIG. 1, of achieving lossless calls consistent with the present disclosure. Of course, additional steps, receptions, and/or transmissions not disclosed herein could be additionally added before, after, or in-between steps, receptions, and/or transmissions disclosed in FIGS. 3A-3B, 5A-5B, and 6A-6B, and the presence of such additional steps, receptions, and/or transmissions would not negate the purpose and advantages of the examples set forth in detail throughout the remainder of this disclosure.

Figure 3A:
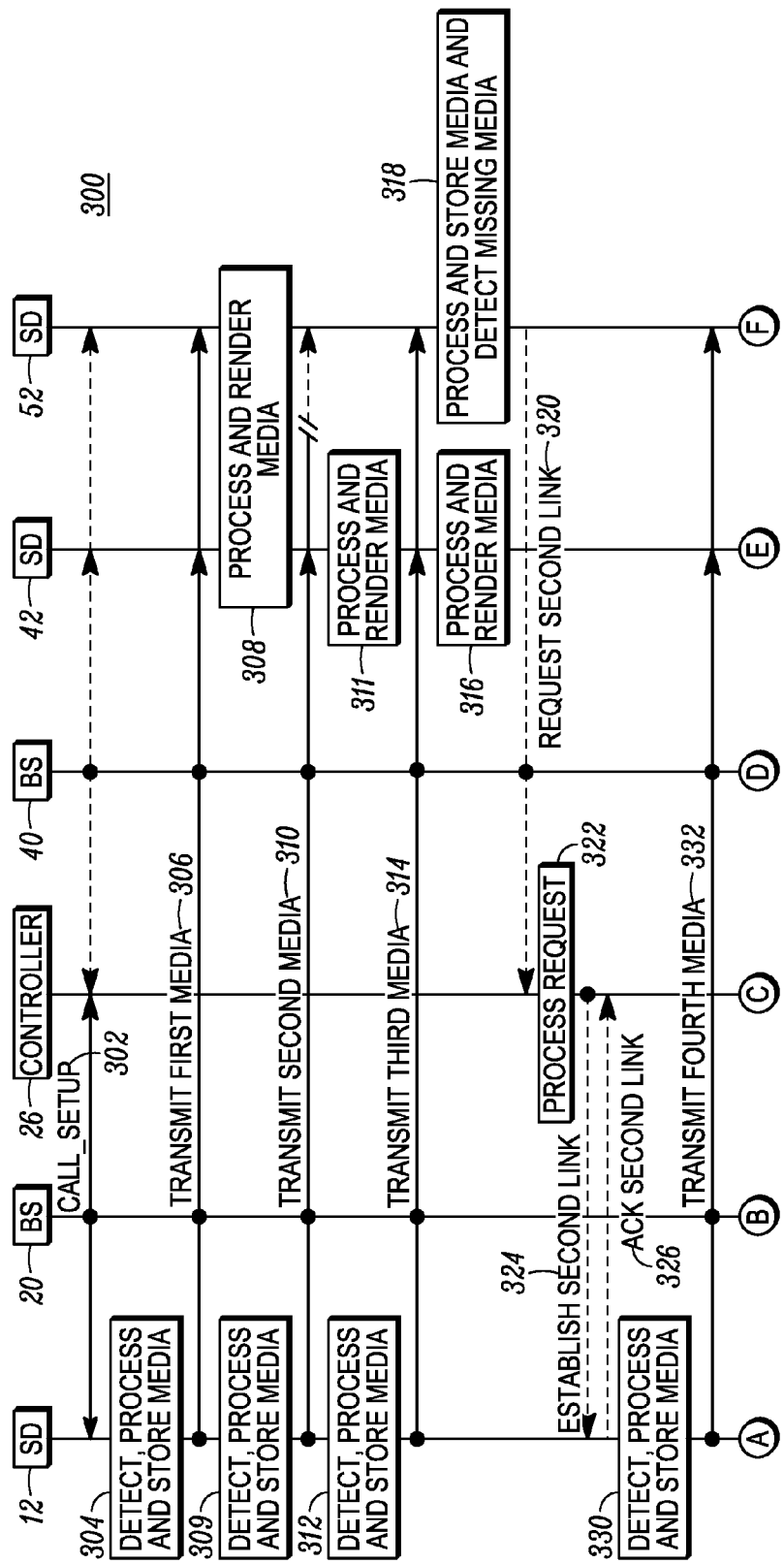
FIGS. 3A-3B set forth a timing diagram illustrating processing steps and message transmissions across devices in the communications network of FIG. 1 for achieving lossless calls in which a source subscriber device buffers transmitted media items, in accordance with an embodiment.
Figure 3B:
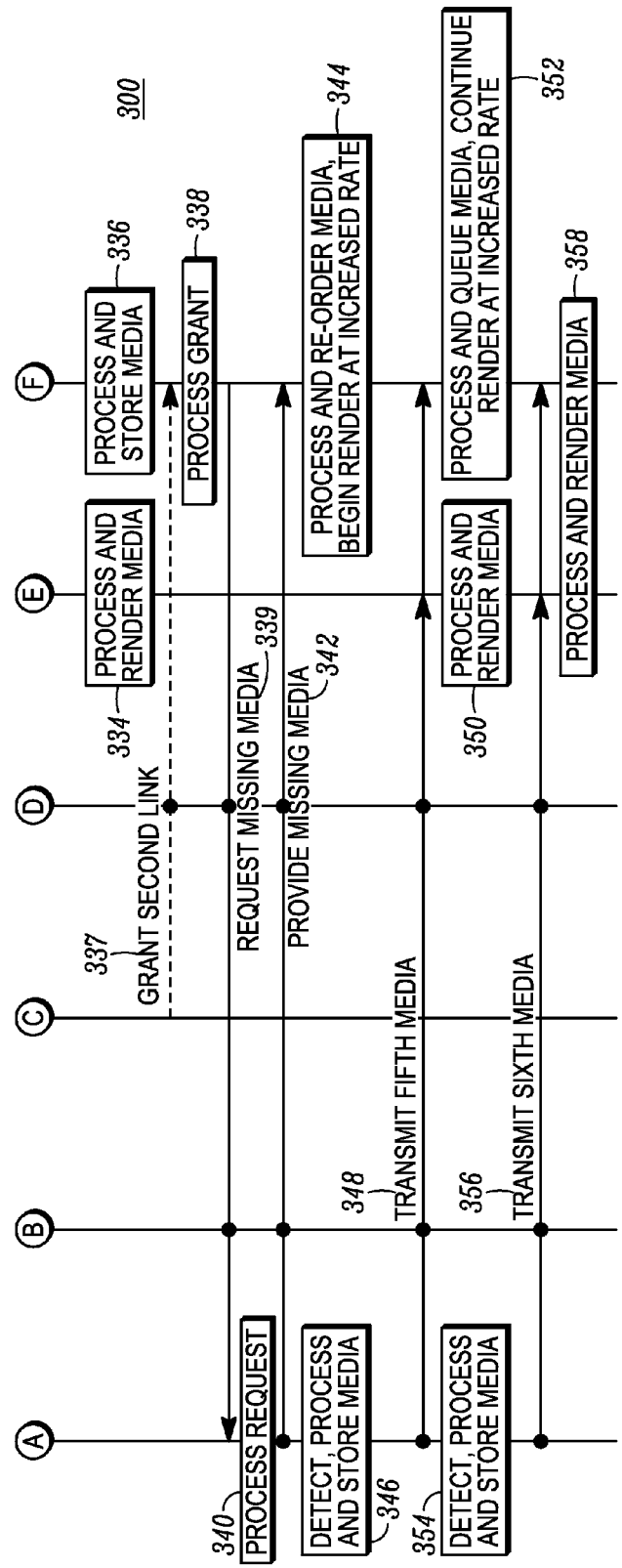
Figure 5A:
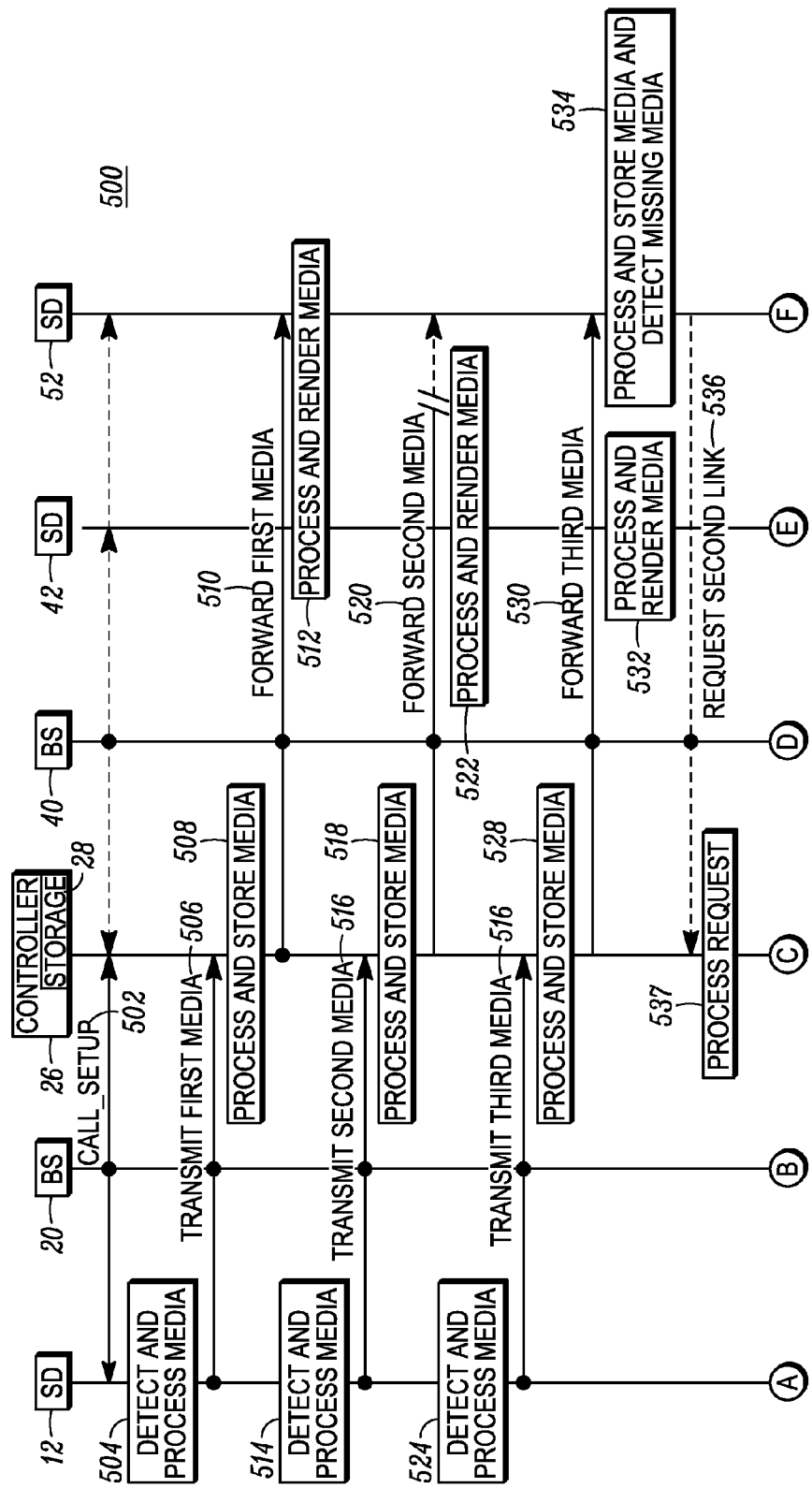
FIGS. 5A-5B set forth a timing diagram illustrating processing steps and message transmissions across devices in the communications network of FIG. 1 for achieving lossless calls in which a network device buffers transmitted media items, in accordance with an embodiment.
Figure 5B:
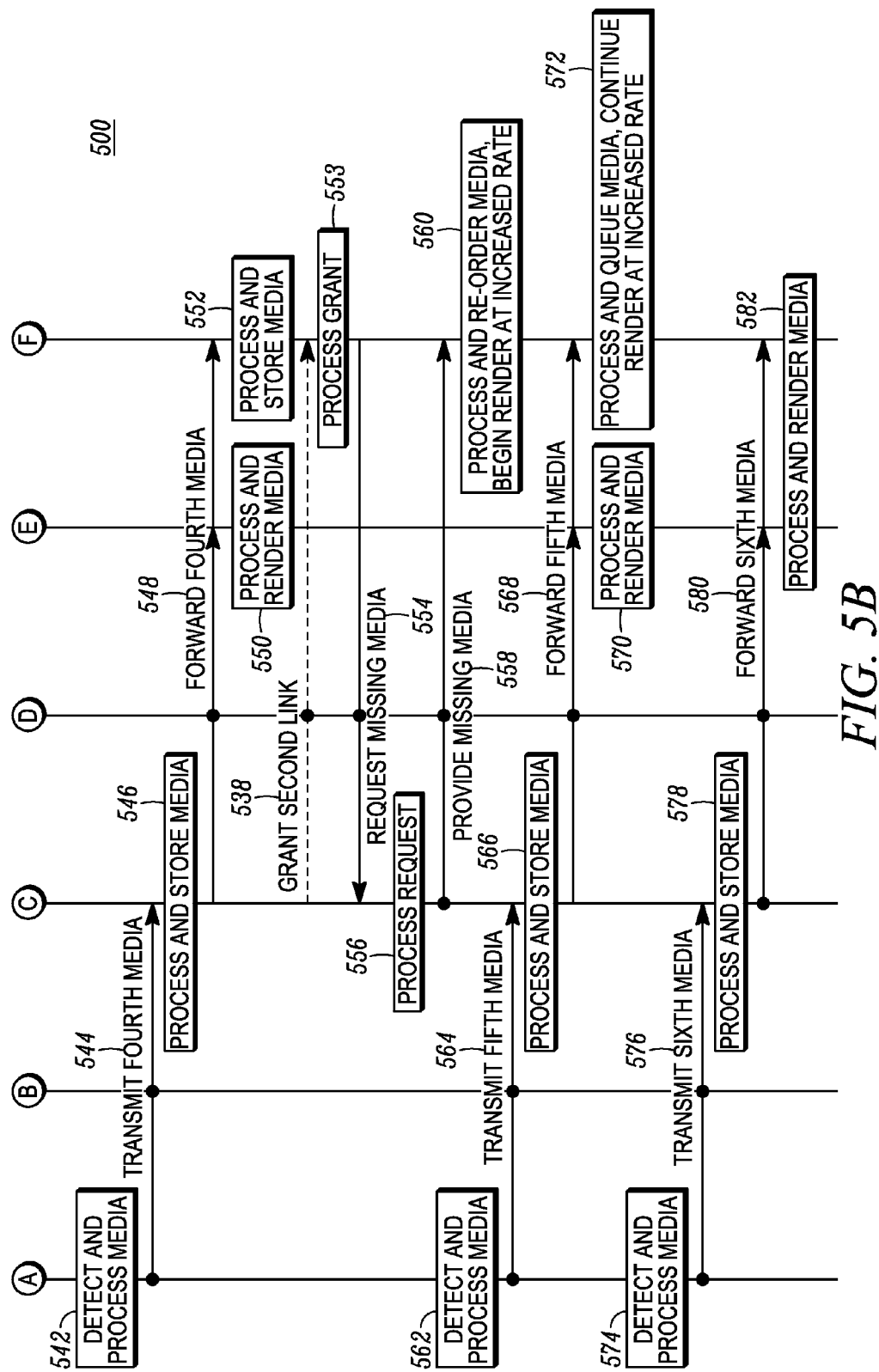
Figure 6A:
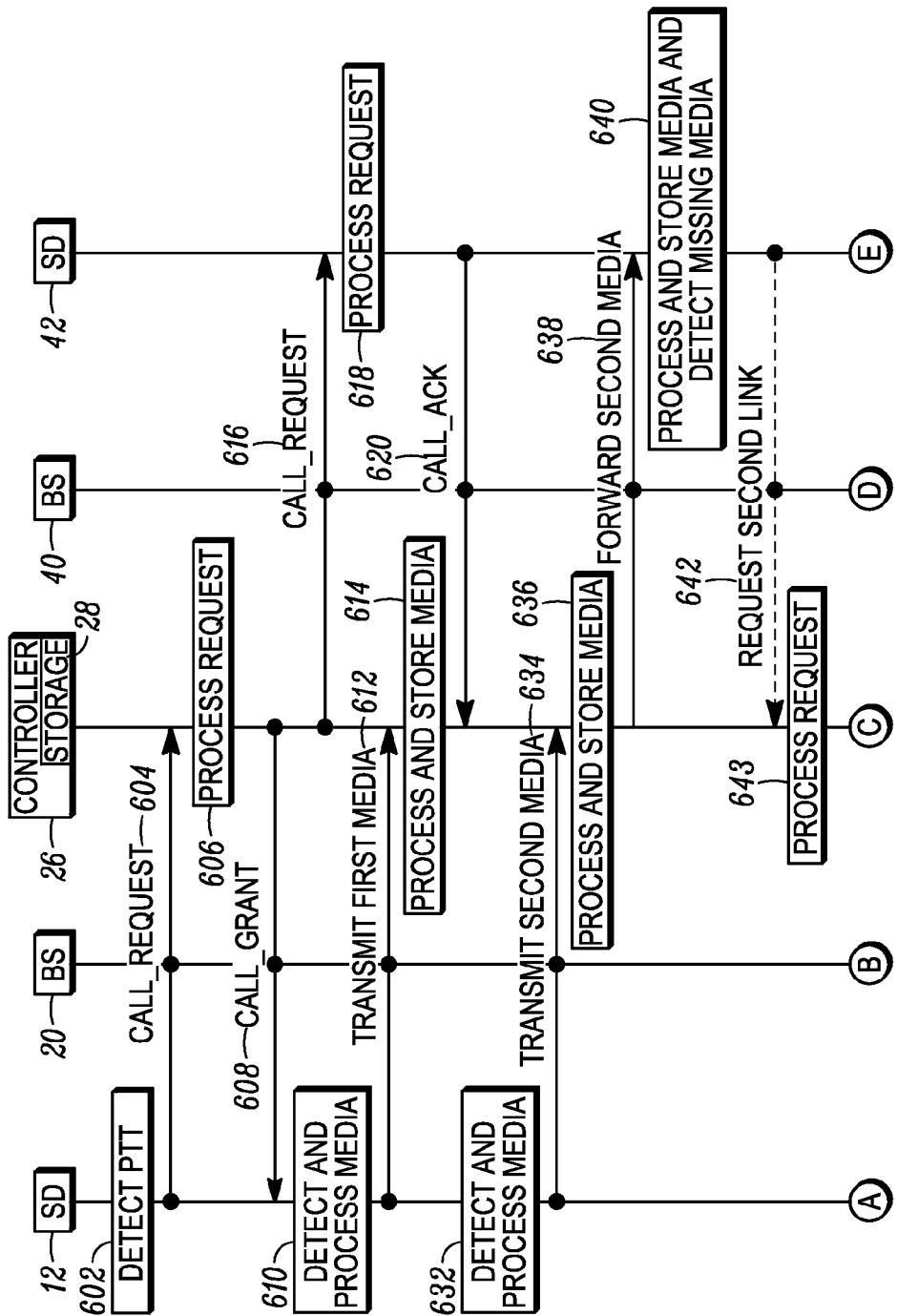
FIGS. 6A-6B set forth a timing diagram illustrating processing steps and message transmissions across devices in the communications network of FIG. 1 for achieving lossless calls in which a source subscriber device is allowed to begin transmitting before the requested call is finished being set up by the network, in accordance with an embodiment.
Figure 6B:
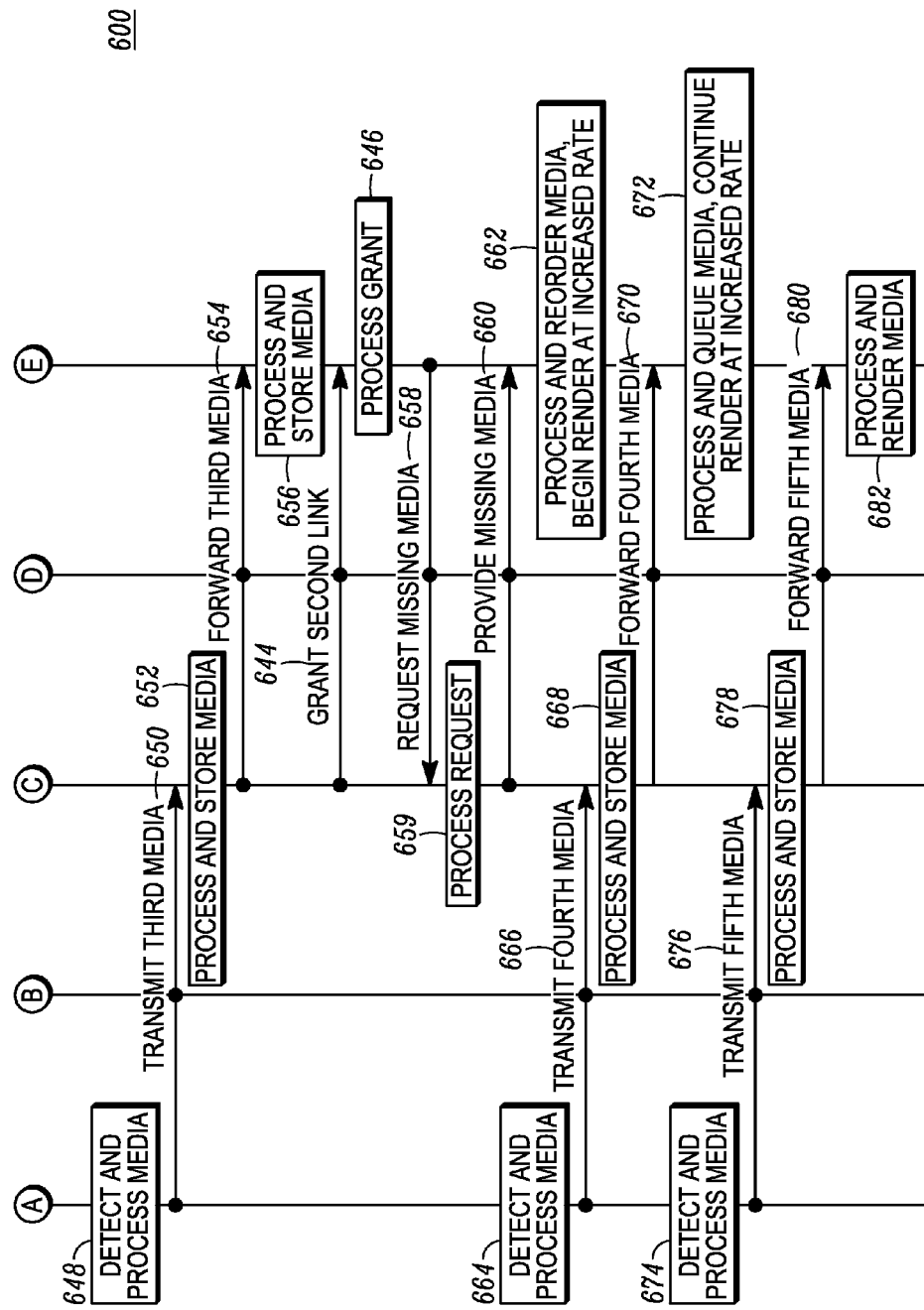

FIGS. 3A-3B illustrate an example in accordance with an embodiment for achieving lossless calls in which a source subscriber device buffers transmitted media items and responds to requests from target subscriber devices for missing media items. FIGS. 5A-5B, although similar, describe an alternate embodiment in which a network device may buffer the transmitted media items on behalf of the source subscriber device and respond to requests from target subscriber devices for missing media items. FIGS. 6A-6B describe another alternate embodiment in which a source subscriber device is allowed to begin transmitting a call before the requested call is set up by the network by using processes similar to those set forth in FIGS. 3A-3B and 5A-5B. FIGS. 4A-4C are waveform diagrams illustrating the differences between a source speech waveform generated at a source subscriber device, a speech waveform rendered at a conventional subscriber device due to an audio hole, and an adjusted speech waveform rendered at a target subscriber device due to an audio hole in accordance with the embodiments of FIGS. 3A-3B and/or 5A-5B. Although FIGS. 4A-4C are particularly directed to audio signal wave forms, similar processes for achieving lossless media calls can be applied to other types of media, such as video. FIGS. 4A-4C may also be applicable to the embodiment of FIGS. 6A-6B if it is assumed that the call starts at the time of the audio hole, and the waveform portions before approximately 4.5s are ignored.

Furthermore, while FIGS. 3A-3B and 5A-5B illustrate a group call scenario, the examples of FIGS. 3A-3B and 5A-5B are equally applicable to individual calls. Finally, while FIGS. 6A-6B illustrate an individual call scenario, the example of FIGS. 6A-6B is equally applicable to group calls. Any one of the embodiments set forth in FIGS. 3A-3B, 5A-5B, and 6A-6B could be applied to all SDs in a system, or only to select SDs in a system, perhaps based on a priority level associated with a particular SD, such that a higher priority SD or group of SDs will be provided the corresponding lossless call functionality, while a lower priority SD or group of SDs will not. In other embodiments, only certain types of calls, such as emergency calls (which are signaled as such in the call request and/or embedded within the call) may be provided the corresponding lossless call functionality, while non-emergency calls are not. Other possibilities exist as well.

Returning then to FIG. 3A, while a new group call between source SD 12 and target SDs 42 and 52 generally requires a call setup procedure including a call request transmitted by the call initiating SD 12 and a call grant acknowledging and granting the requested group call transmitted back to the call initiating SD 12 via its serving BS 20, such details are well known to one of ordinary skill and are illustrated in FIG. 3A simply via a call_setup 302 process for ease of illustration purposes. Portions of the communications path in the call_setup 302 process are drawn in dashed form to illustrate that some protocols may or may not require communications with the target SDs when initiating an individual or group call In any event, during the call_setup 302 process, the SD 12 that is a member of group G_A detects the depression of a PTT button indicating a desire of its user to transmit a media stream to other SDs in its subscribed group G_A (in this example, including SDs 42 and 52). Accordingly, and in response, the SD 12 establishes an uplink channel for the call with its serving BS 20. The call_setup 302 process may establish an uplink channel over primary link 14 for transmitting the call (a downlink portion of which may be used for reverse signaling and/or control), and in one embodiment, may establish a secondary link 16 (including an uplink channel and a downlink channel) for receiving requests for missing media items and fulfilling those requests.

In other embodiments, the secondary link 16 may be established on demand in response to a request for a missing media item from a target SD. The primary (first) radio link 14 and the secondary (second) radio link 16 are established on different physical or logical channels. For example, the primary radio link 14 may be a first time slot channel of a multi-slot time division multiple access (TDMA) radio link, and the secondary radio link 16 a second time slot channel of the multi-slot TDMA radio link. The first and second time slot channels may occur on a same or different frequency. In another embodiment, the primary radio link 14 may be a first frequency channel (or pair of channels) of a multi-frequency frequency division multiple access (FDMA) system, and the secondary radio link 16 a second frequency channel (or pair of channels) of the multi-frequency FDMA system. In a still further embodiment, the primary radio link 14 may be a first logical traffic channel (or pair of logical traffic channels) over an LTE physical channel, and the secondary radio link 16 a second logical traffic channel (or pair of logical traffic channels) over the same or different LTE physical channel. In another embodiment, the primary radio link 14 may be a first set of codes in a CDMA system, and the secondary radio link 16 a second non-overlapping set of codes in the CDMA system. Other possibilities exist as well.

In an example narrowband trunked radio system, the primary radio link 14 over which the call traffic will be transmitted may be established over an assigned traffic channel that is different from a control channel over which a call request for the call was transmitted. Also during this process, the controller 26 may cause base stations serving other SDs that are members of a group subscribed to receive the call to assign a traffic channel for the call and broadcast a new call announcement identifying the traffic channel for the call over each control channel associated with each base station (e.g., via BS 40 in this example).

In an example narrowband conventional radio system, the primary radio link 14 over which the call traffic will be transmitted may be established over the same conventional channel over which the call request for the call was transmitted. Also during this process, the controller 26 may cause base stations serving other SDs that are members of a group subscribed to receive the call to broadcast a new call announcement identifying the new call over a conventional channel associated with each base station (e.g., via BS 40 in this example).

Still further, in an example broadband radio system, the primary radio link 14 may be established over an existing or newly allocated logical traffic channel for the call at the source SD's base station (e.g., BS 20 in this example), different from a control channel over which the request for the call was transmitted. Also during this process, the controller 26 may cause base stations serving other SDs that are members of a group subscribed to receive the call to separately establish (or identify existing) logical traffic channels for each SD receiving the call, or establish a multicast traffic channel (e.g., an MBMS channel) at each base station serving other SDs that are members of a group to receive the call, perhaps using a paging channel or multicast control channel (e.g., via BS 40 in this example).

Other examples are possible as well in different protocols or radio architectures.

At step 304, the initiating SD 12 captures its user's voice, surrounding audio, and/or surrounding video (e.g., captures a media stream) or retrieves previously stored voice, audio, and/or video (e.g., loads a stored media stream), formats the media stream into one or more first media items for transmission (each media item including a unique sequential number included in or embedded in a header, burst, frame, or packet of the media item) stores the first media items themselves or stores the media stream along with a mapping that maps each portion of the media stream to a corresponding unique sequential number of the first media item in which it was transmitted, and then transmits one or more corresponding first media items in a XmitFirstMedia 306 transmission to its serving BS 20 over the primary radio link 14, which then forwards the first media items to one of the BS 40 and the controller 26.

A first unique sequential number for a first media item in each new call or media stream associated with each source SD may be set to a pre-configured value such as 0, or may be set to some random or pseudo-random number by each source SD. The first unique sequential number may increment up or down for each subsequent media item transmitted, and may increment by an integer or decimal amount greater than 0. As long as the source SD SD 12 and the target SD SD 42 and SD 52 are preconfigured to apply and expect the same increment in the same direction, the target SDs can correctly detect a missing media item.

In the case of a narrowband communications system, the media item(s) may be, for example, a DMR burst consisting of two 108-bit payload fields containing a portion of the media stream and a 48-bit synchronization or signaling field that uniquely identifies the media item and the source transmitting SD 12 and can be used by target SDs and the source transmitting SD 12 to request and respond to a request for that uniquely identified media item. In the case of a broadband communication system, the media item(s) may be, for example, an RTP packet including a header identifying the source transmitting SD 12 and a sequential packet flow identifier that uniquely identifies the media item and can be used by the target SDs and the source transmitting SD 12 to request and respond to a request for that uniquely identified media item. Other examples are possible as well.

At step 308, the target SDs 42 and 52 receive the XmitFirstMedia 306 transmission over primary radio link 46, extract and decode portions of the original media stream from the one or more formatted media items provided by the XmitFirstMedia 306 transmission, and begin rendering the portion of the decoded media stream at a first nominal rate (e.g., a rate at which the media stream was intended to be rendered and which is relatively lower than an increased rendered rate that may be used to render buffered portions of the media stream in order to "catch up" to real-time rendering of the received media items in the event of missed media items). For example, media streams originally encoded at a particular quality, size, bit rate, frame rate, number of layers, and/or sampling rate at the source SD will be rendered at the target SD(s) at the same particular quality, size, bit rate, frame rate, number of layers, and/or sampling rate. For example, an audio signal encoded at a sampling rate of 44.1 kHz is played back at the target SD(s) at the same sampling rate. Further, a video signal encoded at 30 frames per second is rendered at the same rate of 30 fps. Other examples are possible as well. The nominal rate at which a received media stream was intended to be rendered may be pre-configured at the target SDs, embedded in the transmitted media items or in the (originally encoded and now) decoded media stream, or determined via a rendering value received over the primary radio link, such as in a header or embedded control signaling. Other possibilities exist as well.

Also at step 308, each target SD that receives the call stores the sequential media item number from a last one of the one or more media items of the XmitFirstMedia 306 transmission indicative of a last received media item. As set forth above, the indicator may be a sequential number included in or embedded in a header, burst, frame, or packet and may be extracted and stored at each target SD for use in determining whether a media item for a call from a particular source SD has been missed. The target SDs may associate or map each stored sequential media item number with the source transmitting SD so as to distinguish media streams that may be received from other source transmitting SDs. For example, the target SDs may map the stored sequential media item number with a radio ID, MAC address, source IP address, or some other unique identifier that identifies the source SD (in this case, SD 12).

At step 309, the initiating SD 12 again captures its user's voice, surrounding audio, and/or surrounding video (e.g., captures a media stream) or retrieves additional stored voice, audio, and/or video (e.g., loads a stored media stream), formats the media stream into one or more second media items for transmission (numbered bursts, frames, packets, etc.), stores the second media items themselves or stores the additional media stream along with a mapping that maps each portion of the additional media stream to a corresponding numbered second media item for transmission, and then transmits the one or more corresponding second media items in a XmitSecondMedia 310 transmission to its serving BS 20, which then forwards the second media items to one of the BS 40 and the controller 26.

At step 311, the target SD 42 receives the XmitSecondMedia 310 transmission, extracts and decodes portions of the original media stream from the one or more second media items provided by the XmitSecondMedia 310 transmission, and continues rendering the portion of the decoded media stream at the first nominal rate. Also at step 311, SD 42 compares the sequential media item number of the first one of the one or more second media items in the XmitSecondMedia 310 transmission to the stored last sequential media item number from the last one of the one or more first media items in the XmitFirstMedia 306 transmission to determine if any media items were missed, and after determining that no media items were missed, continues rendering the decoded media stream at the first nominal rate. SD 42 also stores the sequential media item number from a last one of the one or more second media items of the XmitSecondMedia 310 transmission indicative of a last received media item, again, perhaps along with an identifier identifying the source transmitting SD 12.

On the other hand, and due to some event, in this example SD 52 does not receive the XmitSecondMedia 310 transmission, and therefore misses one or more second media items (and accordingly the one or more unique sequential media item numbers) from the XmitSecondMedia 310 transmission. The event causing SD 52 to miss the transmission may be due to any number of factors including the SD 52 temporarily going out of range, the appearance of a temporary interferer within the range of SD 52, a handover or cell reselection process initiated at SD 52, a geographic feature such as a building, hill, or tunnel temporarily blocking communications between SD 52 and its serving base station BS 40, or user action at the SD 52 such as the swapping out of batteries.

At step 312, the initiating SD 12 again captures its user's voice, surrounding audio, and/or surrounding video (e.g., captures a media stream) or retrieves additional stored voice, audio, and/or video (e.g., loads a stored media stream), formats the media stream into one or more third media items for transmission (numbered bursts, frames, packets, etc.), stores the third media items themselves or stores the additional media stream along with a mapping that maps each portion of the additional media stream to a corresponding numbered third media item for transmission, and then transmits one or more corresponding third media items in a XmitThirdMedia 314 transmission to its serving BS 20, which then forwards the third media items to one of the BS 40 and the controller 26.

At step 316, the target SD 42 receives the XmitThirdMedia 314 transmission, extracts and decodes portions of the original media stream from the one or more third media items provided by the XmitThirdMedia 314 transmission, compares the sequential media item number of the first one of the one or more third media items in the XmitThirdMedia 314 transmission to the stored last sequential media item number from the last one of the one or more second media items in the XmitSecondMedia 310 transmission to determine if any media items were missed, and after determining that no media items were missed, continues rendering the decoded media stream at the first nominal rate.

On the other hand, at approximately the same time as step 316, at step 318, SD 52 receives the XmitThirdMedia 314 transmission, extracts and decodes portions of the original media stream from the one or more third media items provided by the XmitThirdMedia 314 transmission, compares the sequential media item number of the first one of the one or more third media items in the XmitThirdMedia 314 transmission to the stored last sequential media item number from the last one of the one or more first media items in the XmitFirstMedia 306 transmission that it successfully received to determine if any media items were missed, and after determining that media items were missed, refrains from rendering the decoded media stream from the third media items in XmitThirdMedia 314 transmission, and instead buffers them.

In addition, and responsive to determining that it has missed one or more media items transmitted by the source SD 12, target SD 52 begins the process of requesting the missing media items. If a second radio link has already been established, for example during call setup 302, the target SD 52 can begin requesting the missing media immediately via steps similar to those set forth in message transmissions and processing steps 338-344, discussed below. However, if the second radio link has not already been established, and instead is established on an as-needed basis, target SD 52 must first request a second radio link as indicated via dashed line RequestSecondLink 320 transmission in FIG. 3A transmitted to controller 26 via serving BS 40.

The RequestSecondLink 320 message may be transmitted to BS 40 via a control channel separate from the primary radio link 46 over which the call is being transmitted by BS 40, via a corresponding uplink portion of the primary radio link 46 over which the call is being transmitted by BS 40, via a stealing channel formed by stealing portions of the primary radio link 46 over which the call is being transmitted by BS 40 (including, e.g., uplink and/or downlink portions of the primary radio link 46), or via some other mechanism. Use of such stealing channels is well known to those having ordinary skill in the art, and generally concerns multiplexing signaling information over a voice traffic channel. For example, the TETRA (Terrestrial, Trunked Radio) digital mobile communications systems employ such stealing channels.

In some embodiments, target SDs such as SD 52 may include more than one transceiver to allow it to transmit the missing media request simultaneously with the target SD's continued participation in the call (for example, for FDMA systems). In other embodiments, the second radio link may comprise a second timeslot (for TDMA), code (for CDMA), or sub-carrier (for OFDMA) that allows the request to be transmitted via a same transceiver used to continue to participate in the call on the primary radio link 46.

At step 322, the controller 26 processes the request for a second radio link, determines if such an additional second radio link is available at the BS 40, and determines if a second radio link is also required (and/or already exists) at the source SD's BS 20 to allow the source SD 12 to provide the missing media items. As set forth above with respect to SD 52, the source SD 12 may have established a second radio link with its serving BS 20 at the time of call_setup 302, and therefore, a second radio link may not need to be setup at step 322. Assuming a second radio link has not yet been set up at BS 20 for use by SD 12 in fulfilling missing media item requests, and assuming resources are available at BS 20 to establish a second radio link, the controller 26 may cause an EstablishSecondLink 324 message to be transmitted to the source SD 12 instructing the source SD 12 that a second radio link is being established. The EstablishSecondLink 324 message may be transmitted to SD 12 via a control channel separate from the primary radio link 14 over which the call is being transmitted to BS 40, via a corresponding downlink portion of the primary radio link 14 over which the call is being transmitted by SD 12, via a stealing channel formed by stealing portions of the primary radio link 14 over which the call is being transmitted by SD 12, or via some other mechanism.

In some embodiments, source SDs such as SD 12 may include more than one transceiver to allow it to receive the second radio link request simultaneously with the source SD's continued participation in the call (for example, for FDMA systems). In other embodiments, the second channel may comprise a second timeslot (for TDMA), code (for CDMA), or sub-carrier (for OFDMA) that allows the request to be received via a same transceiver used to continue to participate in the call on the primary radio link 46. The EstablishSecondLink 324 message may include information identifying an assigned second traffic channel (or pair of channels) to which to tune to fulfill the missing media items. The source SD 12 may acknowledge receipt of the message via a transmitted acknowledgment message AckSecondLink 326.

While the target SD 52 is attempting to establish a second radio link and request the missing media items, the source SD 12 does not stop transmitting its media stream, and at step 330 again captures its user's voice, surrounding audio, and/or surrounding video (e.g., captures a media stream) or retrieves additional stored voice, audio, and/or video (e.g., loads a stored media stream), formats the media stream into one or more fourth media items for transmission (numbered bursts, frames, packets, etc.), stores the fourth media items themselves or stores the additional media stream along with a mapping that maps each portion of the additional media stream to a corresponding numbered fourth media item for transmission, and then transmits one or more corresponding fourth media items in a XmitFourthMedia 332 transmission to its serving BS 20 via the primary radio link 14, which then forwards the fourth media items to one of the BS 40 and the controller 26.

At step 334, similar to step 316, the target SD 42 receives the XmitFourthMedia 332 transmission, extracts, decodes, compares, and renders the decoded media stream at the first nominal rate in a manner as set forth in step 316.

At approximately the same time as step 334, at step 336, SD 52 receives the XmitFourthMedia 332 transmission, extracts and decodes portions of the original media stream from the one or more fourth media items provided by the XmitFourthMedia 332 transmission, determines that it has still not received the missing media items previously detected, and responsively refrains from rendering the decoded media stream from the fourth media items in the XmitFourthMedia 332 transmission, and instead buffers them in chronological order (first in, first out) with respect to the third media items in the XmitThirdMedia 314 transmission. Also at step 336, and because there is a limit to the amount of media the target SD 52 can buffer before the call is simply dropped, the SD 52 may determine whether a threshold maximum number of missed media items has been reached. The threshold maximum number of missed media items equates to between three to five seconds of rendered media when rendered at the first nominal rate. The threshold maximum number may be set as a maximum amount of storage consumed by the buffered media items, a maximum number of missed media items, or a calculated playback time based on the number of media items held in storage using the first nominal rate, among other possibilities. If the threshold has been reached, SD 52 may simply drop the call, and provide an indication of such to its user (due to, perhaps, roaming too far outside of a transmission range of its serving BS 40 for too long of a period of time). Of course, in other embodiments, in addition to or in place of the threshold maximum number of missed media items, an L2 timer may control when and whether to drop a call, where the L2 timer measures an amount of time that has passed since a message (such as a sync message) has last been received at the SD from the infrastructure (the BS 40 in this case). Once the L2 timer hits preconfigured maximum time duration, the call is dropped. Other possibilities exist as well.

Assuming that controller 26 has set up the requested second radio link(s) and transmitted a GrantSecondLink 337 message to target SD 52 (received and processed at step 338), or that second radio link(s) were already previously established during call setup 302, SD 52 eventually transmits a RequestMissingMedia 339 message over the established second radio link(s) (56 and 16, in this example) to source SD 12 (identified as the source SD by the target SD by the target SD processing the first or third media items) requesting the missing media items identified at step 318. The RequestMissingMedia 339 message may include the one or more sequential media item identifiers that identify the media items missed from the un-received XmitSecondMedia 310 transmission, between the last one of the XmitFirstMedia 316 transmission and the first one of the XmitThirdMedia 314 transmission. In other embodiments, the request may identify the last media item received (by sequential media item identifier), and request all media items before that one, or may specify a range of media items it is missing, among other possibilities.

At step 340, the source SD 12 receives the RequestMissingMedia 339 message and, based on the identifiers included in the message, retrieves either the missing media items themselves, or creates new replacement media items using the stored media stream and mappings stored at one or more of steps 304, 309, 312, and 330. SD 12 then transmits the missing media items in a ProvideMissingMedia 342 message via the second radio link 16 between SD 12 and BS 20 and via the second radio link 56 between BS 40 and SD 52. The media items in the ProvideMissingMedia 342 include the same media stream portions and unique media item identifiers as the media items in the XmitSecondMedia 310 transmission that was not received by the target SD 52. The ProvideMissingMedia 342 and the XmitSecondMedia 310 transmissions may not be identical due to different time stamps and different destination addresses (e.g., the ProvideMissingMedia 342 transmission may indicate the individual target address, e.g., MAC, IP, or radio ID, of SD 52 instead of a group address G_A used for the call).

At step 344, the target SD 52 receives the ProvideMissingMedia 342 message, extracts, and decodes missing portions of the original media stream from the one or more second media items provided by the ProvideMissingMedia 342 transmission, compares the sequential media item numbers of the second media items of the ProvideMissingMedia 342 message and re-orders them chronologically or sequentially relative to the buffered media items stored locally at the SD 52 from the XmitThirdMedia 314 and XmitFourthMedia 332 transmissions to create a re-ordered subsequent media stream, and begins rendering the re-ordered subsequent media stream stored locally at SD 52 at an increased rendering rate compared to the first nominal rate.

The SD 52 may be pre-configured to use a particular increased rendering rate (compared to the nominal rate) based on the type of media being received, or may be configured to dynamically determine the particular increased rendering rate based on a number of factors, such as one or more of the type of media being received, the size or amount of media items currently buffered at the SD, and a maximum increased rendering rate that still allows the media to be understood by the user. For example, if only a few missing media items are stored locally at the target SD 52, the rendering rate may be increased by a somewhat limited 5-10%. If, however, there is a significant amount of missing media items stored locally at the target SD 52, the rendering rate may be increased to 20-25%, closer to a maximum rendering rate of substantially 30% at which audio and/or video tends to lose its ability to convey its intended meaning with clarity and without significant effects on audio pitch and other media characteristics.

While the target SD 42 is rendering media received in XmitFourthMedia 332 transmission at the nominal rate and SD 52 is rendering buffered media at the increased rendering rate, the source SD 12 does not stop transmitting its captured media stream, and at step 346 again captures its user's voice, surrounding audio, and/or surrounding video (e.g., captures a media stream) or retrieves additional stored voice, audio, and/or video (e.g., loads a stored media stream), formats the media stream into one or more fifth media items for transmission (numbered bursts, frames, packets, etc.), stores the fifth media items themselves or stores the additional media stream along with a mapping that maps each portion of the additional media stream to a corresponding numbered fifth media item for transmission, and then transmits one or more corresponding fifth media items in a XmitFifthMedia 348 transmission to its serving BS 20, which then forwards the fifth media items to one of the BS 40 and the controller 26.

At step 350, similar to step 334, the target SD 42 receives the XmitFifthMedia 348 transmission, extracts, decodes, compares, and renders the decoded media stream at the first nominal rate in a manner as set forth in step 334.

At approximately the same time as step 350, at step 352, SD 52 receives the XmitFifthMedia 348 transmission, buffers it behind any remaining media items not yet rendered from the XmitFourthMedia 332 transmission, and continues rendering the buffered re-ordered subsequent media stream at the increased rendering rate until the buffer is close to or becomes empty.

At step 354, SD 12 again captures its user's voice, surrounding audio, and/or surrounding video (e.g., captures a media stream) or retrieves additional stored voice, audio, and/or video (e.g., loads a stored media stream), formats the media stream into one or more sixth media items for transmission (numbered bursts, frames, packets, etc.), stores the sixth media items themselves or stores the additional media stream along with a mapping that maps each portion of the additional media stream to a corresponding numbered sixth media item for transmission, and then transmits one or more corresponding sixth media items in a XmitSixthMedia 356 transmission to its serving BS 20, which then forwards the sixth media items to one of the BS 40 and the controller 26.

At step 358, similar to step 308, the target SDs 42 and 52 receive the XmitSixthMedia 356 transmission, extract, decode, compare, and render the decoded media stream at the first nominal rate in a manner as set forth in step 308. Further transmissions and rendering may continue until the call is ended and the primary and/or secondary links torn down. The second radio link(s) may be torn down after the request for missing media items is fulfilled (and re-established again upon demand), or may be left open for future use during the call.

FIGS. 4A-4C illustrate an example achievement of a lossless audio call in the face of packet loss in accordance with an embodiment. FIG. 4A illustrates an original speech signal 402 captured at the source transmitting SD (SD 12, for example). FIG. 4B illustrates a conventional speech signal 404 that is rendered at a receiving target SD as result of packet loss and without the methods set forth in FIGS. 3A-3B or 5A-5B. And FIG. 4C illustrates an adjusted speech signal 406 in accordance with an embodiment as a result of packet loss and with the lossless call functions of FIGS. 3A-3B at a target SD (SD 52, for example).

The speech signals 404, 406 of FIGS. 4B and 4C are shown without any transmission delay relative to the original speech signal 402 of FIG. 4A for ease of illustration and comparison between the original speech signal 402 and the target SD rendered conventional and adjusted speech signals 404, 406. In practice, there would be some time shift between the speech signals to account for the time delay in transmitting the speech signals and decoding the speech signal at the target SDs.

As shown in FIGS. 4A-4C, during a first period of time 410, there is no packet loss and the original speech signal 402 is reproduced in the conventional and adjusted speech signals 404, 406 at the target SDs to substantially match the original speech signal 402. As shown in FIGS. 4B and 4C, however, during a time 412, and due to a packet loss for any of the reasons already cited above, the portion of the original speech signal 402 is not received at the target SDs. In FIG. 4B, the conventional speech signal 404 represents the conventional approach of simply dropping the missed speech (e.g., due to the failure to receive the media items/packets carrying those portions of the speech signal), resulting in an audio hole 413, and continuing to reproduce subsequently received speech (assuming here that the cause of the packet loss is remedied after the audio hole 413) during the remaining time periods 414, 420.

In contrast, and consistent with the processing steps and message transmissions illustrated in FIGS. 3A-3B and 5A-5B, the adjusted speech signal 406 of FIG. 4C illustrates that the subsequently received speech 416 after the audio hole is not immediately reproduced, but instead, is buffered and a request via a secondary channel is made for the speech signals (media items) missed during the audio hole 413. Once the missing media items are received and the decoded audio stream re-ordered in chronological order, during time period 414, the adjusted speech signal illustrates rendering of the re-ordered speech signals at an increased rate relative to a nominal rate illustrated in speech signals 402 and 404. Once the adjusted speech signal 406 catches up to real-time at approximately the beginning of time period 420, the speech signal 406 illustrates continued rendering of subsequently received speech signals at the nominal rate for the remainder of the time period 420. The ability to retrieve missed media items, and buffer ongoing media items until the missed media items are retrieved, and then to "catch-up" to real time by rendering re-ordered and buffered media at an increased rate is explicitly illustrated in the adjusted speech signal 406 of FIG. 4C. For example, the initial speech signals 416 that are buffered while the missed speech signals missed during time period 412 are retrieved, are played back at a significant time delay as corresponding speech signals 418 in FIG. 4C. Once the device rendering the adjusted speech signal 406 has substantially caught up to real-time, the rendering rate is decreased back to the nominal rate such that, as illustrated by comparing speech segment 422 of conventional speech signal 404 and corresponding speech segment 424 of adjusted speech signal 406, the adjusted speech signal 406 has returned to conventional speech processing for the remaining time period 420, and there is no more delay similar to that between speech signals 416 and 418.

FIGS. 5A-5B illustrate another example in accordance with an embodiment for achieving lossless calls in which an intermediate network device, and not the source subscriber device, buffers transmitted media items and responds to requests from target subscriber devices for missing media items.

FIGS. 5A-5B illustrate, as in FIGS. 3A-3B, a general call_setup 502 procedure including a call request transmitted by the call initiating SD 12 and a call grant acknowledging and granting the requested group call transmitted back to the call initiating SD 12 via its serving BS 20, including any further call setup messaging required to notify the target SDs of the call. During the call_setup 502, the SD 12 that is a member of group G_A detects the depression of a PTT button indicating a desire of its user to transmit a media stream to other SDs in its subscribed group G_A (in this example, including SDs 42 and 52). Accordingly, and in response, the SD 12 establishes an uplink channel for the call with its serving BS 20. The call_setup 502 process may establish an uplink channel over primary link 14 for transmitting the call (a downlink portion of which may be used for reverse signaling and/or control).

In the embodiment of FIGS. 5A-5B, because media items are stored in the network instead of at the source subscriber device SD 12, a secondary link 16 does not need to be established between SD 12 and BS 20, at the time of call_setup 502 or on demand when a target SD determines that it is missing one or more media items. Furthermore, although the source SD 12 is used as the source of the call in this example for ease of illustration, in other embodiments, the call illustrated in FIGS. 5A-5B could be sourced from a device elsewhere in the communications network 10, including for example, a source device communicatively coupled to BS 40 via network 24, communications connection 32, and external networks 34. Processing steps, message transmissions and receptions, and secondary link establishment procedures executed between target SDs 42, 52, BS 40, and controller 26 in FIGS. 5A-5B would remain substantially the same, with only the source of an initial path of media items from the source device to the controller 26 changing from that example illustrated in FIGS. 5A-5B.

In any event, and returning to the example of FIGS. 5A-5B, the primary (first) radio link 14 may be the same or similar to that set forth with respect to FIGS. 3A-3B. Other examples are possible as well in different protocols or radio architectures.

At step 504, the initiating SD 12 captures its user's voice, surrounding audio, and/or surrounding video (e.g., captures a media stream) or retrieves previously stored voice, audio, and/or video (e.g., loads a stored media stream), formats the media stream into one or more first media items for transmission (each media item including a unique sequential number included in or embedded in a header, burst, frame, or packet of the media item), and then transmits one or more corresponding first media items in a XmitFirstMedia 506 transmission to its serving BS 20 over the primary radio link 14, which then forwards the media items to one of or both of the BS 40 and the controller 26. In one embodiment, and as illustrated in this example, the BS 20 may forward the first media items to the controller 26 and rely on the controller to further forward the first media items on to the target SDs at the target BSs (BS 40 in this example). In another embodiment, not shown, the BS 20 may forward the media items, via multiple unicast or via multicast transmission over the network 24 backhaul, to both the controller 26 for storage and to the BS 40 for further transmission to target SDs. The same applies for subsequent media item transmissions 516, 526, 544, 564, and 576.

The unique sequential numbers and the formatting of the media items may be the same or similar to that set forth with respect to FIGS. 3A-3B. Other examples are possible as well.

At step 508, the controller 26 receives and processes the transmitted first media items, including storing the first media items themselves or storing the decoded media stream along with a mapping that maps each portion of the decoded media stream to a corresponding unique sequential number of the first media item in which it was transmitted, and forwards the first media items towards the target SDs in a FwdFirstMedia 510 transmission via BS 40. Of course, in those embodiments in which BS 20 directly forwards the XmitFirstMedia 506 transmission to BS 40, the target SDs would process that transmission instead of the controller-forwarded transmission. Going forward, it is assumed that the BS 20 relies upon the controller 26 to forward the transmissions to BS 40 for re-transmission to the target SDs.

At step 512, the target SDs 42 and 52 receive and process the FwdFirstMedia 510 transmission over primary radio link 46, extract and decode portions of the original media stream from the one or more first media items provided by the transmission, and begin rendering the portion of the decoded media stream at a first nominal rate.

Also at step 512, each target SD that receives the call stores the sequential media item number from a last one of the one or more first media items of the transmission 510 indicative of a last received media item. As set forth above, the indicator may be a sequential number included in or embedded in a header, burst, frame, or packet and may be extracted and stored at each target SD for use in determining whether a media item for a call from a particular source SD has been missed. The target SDs may associate or map each stored sequential media item number with the source transmitting SD so as to distinguish media streams that may be received from other source transmitting SDs. For example, the target SDs may map the stored sequential media item number with a radio ID, MAC address, source IP address, or some other unique identifier that identifies the source SD (in this case, SD 12).

At step 514, the initiating SD 12 again captures its user's voice, surrounding audio, and/or surrounding video (e.g., captures a media stream) or retrieves additional stored voice, audio, and/or video (e.g., loads a stored media stream), formats the media stream into one or more second media items for transmission (numbered bursts, frames, packets, etc.), and then transmits one or more corresponding second media items in a XmitSecondMedia 516 transmission to its serving BS 20, which then forwards the second media items to one or both of the BS 40 and the controller 26.

At step 518, the controller 26 receives and processes the transmitted second media items, including storing the second media items themselves or storing the decoded media stream along with a mapping that maps each portion of the decoded media stream to a corresponding unique sequential number of the second media item in which it was transmitted, and forwards the second media items towards the target SDs in a FwdSecondMedia 520 transmission via BS 40.

At step 522, the target SD 42 receives the FwdSecondMedia 520 transmission, extracts and decodes portions of the original media stream from the one or more second media items provided by the FwdSecondMedia 520 transmission, and continues rendering the portion of the decoded media stream at the first nominal rate. Also at step 522, SD 42 compares the sequential media item number of the first one of the one or more second media items in the FwdSecondMedia 520 transmission to the stored last sequential media item number from the last one of the one or more first media items in the FwdFirstMedia 510 transmission to determine if any media items were missed, and after determining that no media items were missed, continues rendering the decoded media stream at the first nominal rate. SD 42 also stores the sequential media item number from a last one of the one or more second media items of the FwdSecondMedia 520 transmission indicative of a last received media item, again, perhaps along with an identifier identifying the source transmitting SD 12.

On the other hand, and due to some event, in this example SD 52 does not receive the FwdSecondMedia 520 transmission, and therefore misses the one or more second media items (and accordingly the one or more unique sequential media item numbers) from the FwdSecondMedia 520 transmission. The event causing SD 52 to miss the transmission may be due to any number of factors as set forth above.

At step 524, the initiating SD 12 again captures its user's voice, surrounding audio, and/or surrounding video (e.g., captures a media stream) or retrieves additional stored voice, audio, and/or video (e.g., loads a stored media stream), formats the media stream into one or more third media items for transmission (numbered bursts, frames, packets, etc.), and then transmits one or more corresponding third media items in a XmitThirdMedia 526 transmission to its serving BS 20, which then forwards the third media items to one or both of the BS 40 and the controller 26.

At step 528, the controller 26 receives and processes the transmitted third media items, including storing the third media items themselves or storing the decoded media stream along with a mapping that maps each portion of the decoded media stream to a corresponding unique sequential number of the third media item in which it was transmitted, and forwards the third media items towards the target SDs in a FwdThirdMedia 530 transmission via BS 40.

At step 532, the target SD 42 receives the FwdThirdMedia 530 transmission, extracts and decodes portions of the original media stream from the one or more third media items provided by the FwdThirdMedia 530 transmission, compares the sequential media item number of the first one of the one or more third media items in the FwdThirdMedia 530 transmission to the stored last sequential media item number from the last one of the one or more second media items in the FwdSecondMedia 520 transmission to determine if any media items were missed, and after determining that no media items were missed, continues rendering the decoded media stream at the first nominal rate.

On the other hand, at approximately the same time as step 532, at step 534, SD 52 receives the FwdThirdMedia 530 transmission, extracts and decodes portions of the original media stream from the one or more third media items provided by the FwdThirdMedia 530 transmission, compares the sequential media item number of the first one of the one or more third media items in the FwdThirdMedia 530 transmission to the stored last sequential media item number from the last one of the one or more first media items in the FwdFirstMedia 510 transmission that it successfully received to determine if any media items were missed, and after determining that media items were missed, refrains from rendering the decoded media stream from the third media items in FwdThirdMedia 530 transmission, and instead buffers them.

In addition, and responsive to determining that it has missed one or more second media items transmitted by the source SD 12, the target SD 52 begins the process of requesting the missing media items. If a second radio link has already been established, for example during call_setup 502, the target SD 52 can begin requesting the missing media immediately via steps similar to those set forth in message transmissions and processing steps 554-558, discussed below. However, if the second radio link has not already been established, and instead is established on an as-needed basis, target SD 52 must first request a second radio link as indicated via dashed line RequestSecondLink 536 transmission in FIG. 5A transmitted to controller 26 via serving BS 40.

The RequestSecondLink 536 message may be transmitted to BS 40 via a control channel separate from the primary radio link 46 over which the call is being transmitted by BS 40, via a corresponding uplink portion of the primary radio link 46 over which the call is being transmitted by BS 40, via a stealing channel formed by stealing portions of the primary radio link 46 over which the call is being transmitted by BS 40 (including, e.g., uplink and/or downlink portions of the primary radio link 46), or via some other mechanism.

In some embodiments, target SDs such as SD 52 may include more than one transceiver to allow it to transmit the request simultaneously with the target SD's continued participation in the call (for example, for FDMA systems). In other embodiments, the second radio link may comprise a second timeslot (for TDMA), code (for CDMA), or sub-carrier (for OFDMA) that allows the request to be transmitted via a same transceiver used to continue to participate in the call.

At step 537, the controller 26 processes the request for a second radio link and determines if such an additional second radio link is available at the BS 40. Because the media items and/or media stream corresponding to the missing media items are stored at (or accessible to) the controller 26, the controller 26 does not need to establish a secondary link between SD 12 and BS 20 in this embodiment.

While the target SD 52 is attempting to establish a second radio link and request the missing media items, the source SD 12 does not stop transmitting its media stream, and at step 542, again captures its user's voice, surrounding audio, and/ or surrounding video (e.g., captures a media stream) or retrieves additional stored voice, audio, and/or video (e.g., loads a stored media stream), formats the media stream into one or more fourth media items for transmission (numbered bursts, frames, packets, etc.), and then transmits one or more corresponding fourth media items in a XmitFourthMedia 544 transmission to its serving BS 20 via the primary radio link 14, which then forwards the fourth media items to one or both of the BS 40 and the controller 26.

At step 546, the controller 26 receives and processes the transmitted fourth media items, including storing the media items themselves or storing the decoded media stream along with a mapping that maps each portion of the decoded media stream to a corresponding unique sequential number of the fourth media item in which it was transmitted, and forwards the fourth media items towards the target SDs in a Fwd-FourthMedia 548 transmission via BS 40.

At step 550, similar to step 532, the target SD 42 receives the FwdFourthMedia 548 transmission, extracts, decodes, compares, and renders the decoded media stream at the first nominal rate in a same or similar manner as set forth in step 532.

At approximately the same time as step 550, at step 552, SD 52 receives the FwdFourthMedia 548 transmission, extracts and decodes portions of the original media stream from the one or more fourth media items provided by the FwdFourthMedia 548 transmission, determines that it has still not received the missing media items previously detected, and responsively refrains from rendering the decoded media stream from the fourth media items in the FwdFourthMedia 548 transmission, and instead buffers them in chronological order (first in, first out) with respect to the media items in the FwdThirdMedia 530 transmission. Also at step 552, and because there is a limit to the amount of media the target SD 52 can buffer before the call is simply dropped, the SD 52 may determine whether a threshold maximum number of missed media items has been reached. If the threshold has been reached, SD 52 may simply drop the call, and provide an indication of such (due to, perhaps, roaming too far outside of a transmission range of its serving BS 40 for too long of a period of time).

Assuming that controller 26 has set up the requested second radio link(s) and transmitted a GrantSecondLink 538 message to target SD 52 (received and processed at step 553), or that a second radio link was already previously established during call_setup 502, SD 52 eventually transmits a RequestMissingMedia 554 message over the established second radio link (56 in this example) to controller 26 requesting the missing media items identified at step 534. The RequestMissingMedia 554 message may include the one or more sequential media item identifiers that identify the second media items missed from the un-received FwdSecondMedia 520 transmission, between the last one of the FwdFirstMedia 510 transmission and the first one of the FwdThirdMedia 530 transmission, by explicitly identifying each missing media item or specifying a range of missing media item, among other possibilities.

At step 556, the controller 26 receives the RequestMissingMedia 554 message and, based on the identifiers included in the message, retrieves either the formatted missing media items themselves, or creates new replacement media items using the stored media stream and mappings stored at one or more of steps 508, 518, 528, and 546. The controller 26 then transmits the missing media items in a ProvideMissingMedia 558 message via the communications connection 30, network 24, and/or second radio link 56 between BS 40 and SD 52. The media items in the ProvideMissingMedia 558 include the same media stream portions and unique media item identifiers as the second media items in the FwdSecondMedia 520 transmission that was not received by the target SD 52. The ProvideMissingMedia 558 and the FwdSecondMedia 520 transmissions may not be identical due to different time stamps and different destination addresses (e.g., the ProvideMissingMedia 558 transmission may indicate the individual target address, e.g., MAC, IP, or radio ID, of SD 52 instead of a group address G_A used for the call).

At step 560, the target SD 52 receives the ProvideMissingMedia 558 message, extracts, and decodes missing portions of the original media stream from the one or more second media items provided by the ProvideMissingMedia 558 transmission, compares the sequential media item numbers of the second media items of the ProvideMissingMedia 558 message and re-orders them chronologically or sequentially relative to the buffered media items stored locally at the SD 52 from the FwdThirdMedia 530 and FwdFourthMedia 548 transmissions to create a re-ordered subsequent media stream, and begins rendering the re-ordered subsequent media stream stored locally at SD 52 at an increased rendering rate compared to the first nominal rate in a manner the same or similar to that set forth with respect to FIGS. 3A-3B.

While the target SD 42 is rendering media received in FwdFourthMedia 548 at the nominal rate and SD 52 is rendering buffered media at the increased rendering rate, the source SD 12 does not stop transmitting its captured media stream, and at step 562, again captures its user's voice, surrounding audio, and/or surrounding video (e.g., captures a media stream) or retrieves additional stored voice, audio, and/or video (e.g., loads a stored media stream), formats the media stream into one or more fifth media items for transmission (numbered bursts, frames, packets, etc.), and then transmits one or more corresponding fifth media items in a XmitFifthMedia 564 transmission to its serving BS 20, which then forwards the fifth media items to one or both of the BS 40 and the controller 26.

At step 566, the controller 26 receives and processes the transmitted fifth media items, including storing the fifth media items themselves or storing the decoded media stream along with a mapping that maps each portion of the decoded media stream to a corresponding unique sequential number of the fifth media item in which it was transmitted, and forwards the fifth media items towards the target SDs in a FwdFifthMedia 568 transmission via BS 40.

At step 570, similar to step 550, the target SD 42 receives the FwdFifthMedia 568 transmission, extracts, decodes, compares, and renders the decoded media stream at the first nominal rate in a same or similar manner as set forth in step 550.

At approximately the same time as step 570, at step 572, SD 52 receives the FwdFifthMedia 348 transmission, buffers it behind any remaining fourth media items not yet rendered from the FwdFourthMedia 548 transmission, and continues rendering the buffered re-ordered subsequent media stream at the increased rendering rate until the buffer is close to or becomes empty.

At step 574, SD 12 again captures its user's voice, surrounding audio, and/or surrounding video (e.g., captures a media stream) or retrieves additional stored voice, audio, and/or video (e.g., loads a stored media stream), formats the media stream into one or more sixth media items for transmission (numbered bursts, frames, packets, etc.), and then transmits one or more corresponding sixth media items in a XmitSixthMedia 576 transmission to its serving BS 20, which then forwards the sixth media items to one or both of the BS 40 and the controller 26.

At step 578, the controller 26 receives and processes the transmitted sixth media items, including storing the sixth media items themselves or storing the decoded media stream along with a mapping that maps each portion of the decoded media stream to a corresponding unique sequential number of the sixth media item in which it was transmitted, and forwards the sixth media items towards the target SDs in a FwdSixthMedia 580 transmission via BS 40.

At step 582, similar to step 512, the target SDs 42 and 52 receive the FwdSixthMedia 580 transmission, extract, decode, compare, and render the decoded media stream at the first nominal rate in a manner the same or similar to that set forth in step 512. Further transmissions and rendering may continue until the call is ended and the primary and/or secondary links torn down. The second radio link may be torn down after the request for missing media items is fulfilled (and re-established again upon demand), or may be left open for future use during the call.

In a still further embodiment, once the target SD 52 determines at step 534 that it is missing one or more media items, it may refrain from any further processing of the broadcast or multicast media items (e.g., FwdFourthMedia 548) on the primary radio link 46 until it receives, via the second radio link in the ProvideMissingMedia 558 transmission, both the missing second media items and any transmitted broadcast or multicast media items (e.g., the contents of the FwdThirdMedia 530 and/or the contents of the FwdFourthMedia 548 transmission) received and stored by the controller 26 after the missing media items indicated in the RequestMissingMedia message 554. Accordingly, in this embodiment, the functions of storing and re-ordering the media items are unloaded from the SD 52 to the controller 26. After the SD 52 receives the missing media items (and subsequent media items in the stream stored at the controller, if any) in the ProvideMissingMedia 558 message, it will begin rendering at the increased rendering rate, and will again begin buffering subsequently received broadcast or multicast media items on the primary link in the manner set forth in transmissions and processing steps 564-582 of FIG. 5B.

FIGS. 6A-6B illustrate another example in accordance with an embodiment for achieving lossless calls in which a source device is allowed to begin a group or individual call before any call setup is completed at one or more target BSs at one or more remote sites, relying instead on the disclosed embodiments to retrieve media items transmitted by the source device prior to the call being provided at the target BS at the remote sites. FIGS. 6A-6B illustrate a general call setup procedure applicable to many standards and protocols. While the examples in FIGS. 3A-3B and 5A-5B set forth a group call, the example set forth in FIGS. 6A-6B sets forth an individual call, which traditionally is subject to a longer call setup time than a group call. However, the process steps and message transmissions set forth in FIGS. 6A-6B are equally applicable to group calls.

At step 602, the SD 12 that is a member of group G_A detects the depression of a PTT button indicating a desire of its user to transmit a media stream to other SDs in its subscribed group G_A (in this example, including SDs 42 and 52 at a remote target site including BS 40), and transmits a call_request 604 message requesting resources for the call.

At step 606, the controller 26 processes the call_request 604 message and substantially immediately, prior to setting up, announcing, establishing resources, or receiving an acknowledgment from SDs at one or more remote target sites, transmits a call_grant 608 message to the requesting SD SD 12.

At step 610, the SD 12 receives the call grant, moves to any assigned traffic channel (such as a channel of a primary first radio link 14) as necessary and perhaps as indicated in the call grant. The primary (first) radio link 14 may be the same or similar to that set forth with respect to FIGS. 3A-3B. Other examples are possible as well in different protocols or radio architectures.

Also at step 610, the initiating SD 12 captures its user's voice, surrounding audio, and/or surrounding video (e.g., captures a media stream) or retrieves previously stored voice, audio, and/or video (e.g., loads a stored media stream), formats the media stream into one or more first media items for transmission (each media item including a unique sequential number included in or embedded in a header, burst, frame, or packet of the media item), and then transmits one or more corresponding first media items in a XmitFirstMedia 612 transmission to its serving BS 20 over the primary radio link 14, which then forwards the first media items to one of or both of the BS 40 and the controller 26. In one embodiment, and as illustrated in this example, the BS 20 may forward the first media items to the controller 26 and rely on the controller to further forward the media items on to the target SDs at the target BSs (BS 40 in this example). In another embodiment, not shown, the BS 20 may forward the first media items, via multiple unicast or via multicast transmission over the network 24 backhaul, to both the controller 26 for storage and to the BS 40 for further transmission to target SDs. The same applies for subsequent media item transmissions 624, 634, 650, 666, and 676.

The unique sequential numbers and the formatting of the media items may be the same or similar to that set forth with respect to FIGS. 3A-3B. Other examples are possible as well.

At step 614, the controller 26 receives and processes the transmitted first media items, including storing the first media items themselves or storing the decoded media stream along with a mapping that maps each portion of the decoded media stream to a corresponding unique sequential number of the first media item in which it was transmitted, and since the call has not been set up at BS 40 yet, refrains from forwarding the first media items towards the target SDs via BS 40.

At step 616, the controller 26 transmits a call_request 616 message, perhaps on a control channel, conventional channel, paging channel, or logical channel on which SD 42 is idling, informing SD 42 of the new call and perhaps indicating what channel the new call will be made available on. At step 618, the target SD 42 processes the call_request 616 message, transmits an acknowledgment message call_ack 620 message back to the controller 26 via BS 30, and moves to an assigned channel for the call, such as a physical or logical traffic channel as necessary. The assigned channel may be, for example, primary radio link 46 which may be, in this example, a unicast link for the requested individual call.

At step 632, the initiating SD 12 again captures its user's voice, surrounding audio, and/or surrounding video (e.g., captures a media stream) or retrieves additional stored voice, audio, and/or video (e.g., loads a stored media stream), formats the media stream into one or more second media items for transmission (numbered bursts, frames, packets, etc.), and then transmits one or more corresponding second media items in a XmitSecondMedia 634 transmission to its serving BS 20, which then forwards the second media items to one or both of the BS 40 and the controller 26.

At step 636, the controller 26 receives and processes the transmitted second media items, including storing the second media items themselves or storing the decoded media stream along with a mapping that maps each portion of the decoded media stream to a corresponding unique sequential number of the second media item in which it was transmitted, and, since the call has now been setup at the remote site of BS 40, forwards the second media items towards the target SD 42 in a FwdSecondMedia 638 transmission via BS 40.

At step 640, the target SD 42 receives the FwdSecondMedia 638 transmission, extracts and decodes portions of the original media stream from the one or more second media items provided by the FwdSecondMedia 638 transmission, compares the sequential media item number of the first one of the one or more second media items in the FwdSecondMedia 638 transmission to the stored last sequential media item number from the last one of the one or more media items in any prior transmission that it successfully received from the identified source SD 12 (none, or null, in this case) to determine if any media items were missed, and after determining that media items were missed, refrains from rendering the decoded media stream from the second media items in FwdSecondMedia 638 transmission, and instead buffers them.

In addition, and responsive to determining that it has missed one or more media items transmitted by the source SD 12, the target SD 42 begins the process of requesting the missing media items. If a second radio link has already been established, for example during call setup messaging and steps 616, 618, 620, the target SD 42 can begin requesting the missing media immediately via steps similar to those set forth in message transmissions and processing steps 658-660, discussed below. However, if the second radio link has not already been established, and instead is established on an as-needed basis, target SD 42 must first request a second radio link as indicated via dashed line RequestSecondLink 642 transmission in FIG. 6A transmitted to controller 26 via serving BS 40.

The RequestSecondLink 642 message may be transmitted to BS 40 via a control channel separate from the primary radio link 46 over which the call is being transmitted by BS 40, via a corresponding uplink portion of the primary radio link 46 over which the call is being transmitted by BS 40, via a stealing channel formed by stealing portions of the primary radio link 46 over which the call is being transmitted by BS 40 (including, e.g., uplink and/or downlink portions of the primary radio link 46), or via some other mechanism.

In some embodiments, target SDs such as SD 42 may include more than one transceiver to allow it to transmit the request simultaneously with the target SD's continued participation in the call (for example, for FDMA systems). In other embodiments, the second radio link may comprise a second timeslot (for TDMA), code (for CDMA), or subcarrier (for OFDMA) that allows the request to be transmitted via a same transceiver used to continue to participate in the call.

At step 643, the controller 26 processes the request for a second radio link and determines if such an additional second radio link is available at the BS 40. Because the media items and/or media stream corresponding to the missing media items are stored at (or accessible to) the controller 26, the controller 26 does not need to establish a secondary link between SD 12 and BS 20 in this embodiment.

While the target SD 42 is attempting to establish a second radio link and request the missing media items, the source SD 12 does not stop transmitting its media stream, and at step 648, again captures its user's voice, surrounding audio, and/or surrounding video (e.g., captures a media stream) or retrieves additional stored voice, audio, and/or video (e.g., loads a stored media stream), formats the media stream into one or more third media items for transmission (numbered bursts, frames, packets, etc.), and then transmits one or more corresponding third media items in a XmitThirdMedia 650 transmission to its serving BS 20 via the primary radio link 14, which then forwards the third media items to one or both of the BS 40 and the controller 26.

At step 652, the controller 26 receives and processes the transmitted third media items, including storing the third media items themselves or storing the decoded media stream along with a mapping that maps each portion of the decoded media stream to a corresponding unique sequential number of the third media item in which it was transmitted, and forwards the third media items towards the target SDs in a FwdThirdMedia 654 transmission via BS 40.

At step 656, SD 42 receives the FwdThirdMedia 654 transmission, extracts and decodes portions of the original media stream from the one or more third media items provided by the FwdThirdMedia 654 transmission, determines that it has still not received the missing media items previously detected, and responsively refrains from rendering the decoded media stream from the third media items in the FwdThirdMedia 654 transmission, and instead buffers them in chronological order (first in, first out) with respect to the second media items in the FwdSecondMedia 638 transmission. Also at step 656, and because there is a limit to the amount of media the target SD 42 can buffer before the call is simply dropped, the SD 42 may determine whether a threshold maximum number of missed media items has been reached. If the threshold has been reached, SD 42 may simply drop the call, and provide an indication of such (due to, perhaps, roaming too far outside of a transmission range of its serving BS 40 for too long of a period of time).

Assuming that controller 26 has set up the requested second radio link and transmitted a GrantSecondLink 644 message to target SD 42v(received and processed at step 646), or that the second radio link was already previously established during call setup messaging 616-620, SD 42 eventually transmits a RequestMissingMedia 658 message over the established second radio link (44 in this example) to controller 26 requesting the missing media items identified at step 640. The RequestMissingMedia 658 message may include the one or more sequential media item identifiers that identify the first media items missed from the un-forwarded XmitFirstMedia 612 transmission, and/or may request any and all missed media items prior to the first numbered media item of the FwdSecondMedia 638 transmission (indicated in the request), or may request a range of missed media items, among other possibilities.

At step 659, the controller 26 receives the RequestMissingMedia 658 message and, based on the identifier(s) included in the message, retrieves either the first missing media items themselves, or creates new replacement media items using the stored media stream and mappings stored at step 614. The controller 26 then transmits the missing first media items in a ProvideMissingMedia 660 message via the communications connection 30, network 24, and/or second radio link 44 between BS 40 and SD 42. The first media items in the ProvideMissingMedia 660 transmission include the same media stream portions and unique media item identifiers as the media items in the XmitFirstMedia 612 transmission that was not forwarded to the target SD 42 because the downlink channel was not yet setup at BS 40 for the call. The ProvideMissingMedia 660 and the XmitFirstMedia 612 transmissions may not be identical due to different time stamps and/or different destination addresses.

At step 662, the target SD 42 receives the ProvideMissingMedia 660 message, extracts, and decodes missing portions of the original media stream from the one or more first media items provided by the ProvideMissingMedia 660 transmission, compares the sequential media item numbers of the first media items of the ProvideMissingMedia 660 message and re-orders them chronologically or sequentially relative to the buffered media items stored locally at the SD 42 from the FwdSecondMedia 638 and FwdThirdMedia 654 transmissions to create a re-ordered subsequent media stream, and begins rendering the re-ordered subsequent media stream stored locally at SD 42 at an increased rendering rate compared to a first nominal rate in a manner the same or similar to that set forth with respect to FIGS. 3A-3B.

While the target SD 42 is rendering buffered media at the increased rendering rate, the source SD 12 does not stop transmitting its captured media stream, and at step 664, again captures its user's voice, surrounding audio, and/or surrounding video (e.g., captures a media stream) or retrieves additional stored voice, audio, and/or video (e.g., loads a stored media stream), formats the media stream into one or more fourth media items for transmission (numbered bursts, frames, packets, etc.), and then transmits one or more corresponding fourth media items in a XmitFourthMedia 666 transmission to its serving BS 20, which then forwards the fourth media items to one or both of the BS 40 and the controller 26.

At step 668, the controller 26 receives and processes the transmitted fourth media items, including storing the fourth media items themselves or storing the decoded media stream along with a mapping that maps each portion of the decoded media stream to a corresponding unique sequential number of the fourth media item in which it was transmitted, and forwards the fourth media items towards the target SDs in a FwdFourthMedia 670 transmission via BS 40.

At step 672, the target SD 42 receives the FwdFourthMedia 670 transmission, buffers it behind any remaining third media items not yet rendered from the FwdThirdMedia 650 transmission, and continues rendering the buffered re-ordered subsequent media stream at the increased rendering rate until the buffer is close to or becomes empty.

At step 674, SD 12 again captures its user's voice, surrounding audio, and/or surrounding video (e.g., captures a media stream) or retrieves additional stored voice, audio, and/or video (e.g., loads a stored media stream), formats the media stream into one or more fifth media items for transmission (numbered bursts, frames, packets, etc.), and then transmits one or more corresponding fifth media items in a XmitFifthMedia 676 transmission to its serving BS 20, which then forwards the fifth media items to one or both of the BS 40 and the controller 26.

At step 678, the controller 26 receives and processes the transmitted fifth media items, including storing the fifth media items themselves or storing the decoded media stream along with a mapping that maps each portion of the decoded media stream to a corresponding unique sequential number of the fifth media item in which it was transmitted, and forwards the fifth media items towards the target SDs in a FwdFifthMedia 680 transmission via BS 40.

At step 680, the target SD 42 receives the FwdFifthMedia 680 transmission, extracts, decodes, compares, and renders the decoded media stream at the first nominal rate, less than the second increased rate. Further transmissions and rendering may continue until the call is ended and the primary and/or secondary links torn down. The second radio link may be torn down after the request for missing media items is fulfilled (and re-established again upon demand), or may be left open for future use during the call.

In a still further embodiment, once the target SD 42 determines at step 640 that it is missing one or more media items, it may refrain from any further processing of the broadcast or multicast media items (e.g., FwdThirdMedia 654) on the primary radio link 46 until it receives, via the second radio link in the ProvideMissingMedia 660 transmission, both the missing first media items and any transmitted broadcast or multicast media items (e.g., the contents of the FwdSecondMedia 638 and/or the contents of the FwdThirdMedia 654 transmission) received and stored by the controller 26 after the missing media items indicated in the RequestMissingMedia message 658. Accordingly, in this embodiment, the functions of storing and re-ordering the media items are unloaded from the SD 42 to the controller 26. After the SD 42 receives the missing media items (and subsequent media items in the stream stored at the controller, if any) in the ProvideMissingMedia 660 message, it will begin rendering at the increased rendering rate, and will again begin buffering subsequently received broadcast or multicast media items on the primary link in the manner set forth in transmissions and processing steps 666-682 of FIG. 6B.

3. Conclusion

In accordance with the foregoing, an improved method and apparatus for achieving lossless calls when one or more media items in a stream of media items are not received at a target radio due to a temporary reception issue is disclosed. As a result, a more robust individual and group communications system and a quicker call permit tone can be provided, improving communication capabilities of response groups and improving the accuracy and clarify of individual and group communications even in challenging wireless environments. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for achieving a lossless call over a wireless radio network, the method comprising:

receiving, by a target subscriber device during a received call, media items in a stream of media items received over a first radio channel, and rendering the media items at a nominal rendering rate lower than a first increased relative rendering rate;

determining, by a target subscriber device during the received call, that one or more identified media items in the stream of media items of the received call being received over the first radio channel was not successfully received, and responsively:

continuing to receive, by one of an infrastructure controller and the target subscriber device via the first radio channel, first subsequent media items of the received call and buffering, and refraining from rendering at the target subscriber device, the first subsequent media items;

requesting, by the target subscriber device, the identified media items;

one of:

receiving, by the target subscriber device via a second radio channel, different from the first radio channel and established at a time of establishment of the received call or responsive to the determining that the one or more identified media items was not successfully received, the identified media items and re-ordering, by the target subscriber device, the identified media items chronologically with respect to the buffered first subsequent media items to create a re-ordered subsequent media stream; and receiving, by the target subscriber device via a second radio channel, different from the first radio channel and established at the time of establishment of the received call or responsive to the determining that the one or more identified media items was not successfully received, a re-ordered subsequent media stream including the identified media items chronologically ordered with respect to the buffered first subsequent media items;

rendering, by the target subscriber device, the re-ordered subsequent media stream at the first increased relative rendering rate; and subsequently receiving, by the target subscriber device via the first radio channel, second subsequent media items of the received call over the first radio channel and rendering, by the target subscriber device, the second subsequent media items at the nominal rendering rate.

2. The method of claim 1, wherein the nominal rendering rate is a rendering rate that the stream of media items was intended to be rendered.

3. The method of claim 2, wherein the rendering of media items at the first increased relative rendering rate continues until there is no more buffered first subsequent media items to render, after which point the second subsequent media items of the received call received over the first radio channel are rendered at the nominal rendering rate.

4. The method of claim 2, wherein the nominal rendering rate which the stream of media items was intended to be rendered is one of pre-configured at the target subscriber device, embedded in the stream of media items, and determined via a rendering value received over the first radio channel.

5. The method of claim 1, further comprising, prior to rendering the re-ordered subsequent media stream at the first increased relative rendering rate, the target subscriber device determining the first increased relative rendering rate as a function of an amount of first subsequent media items buffered and a maximum increased relative rendering rate.

6. The method of claim 5, wherein the maximum increased relative rendering rate is 30% greater than the nominal rendering rate.

7. The method of claim 1, wherein the first radio channel and the second radio channel are established over different physical channels, and the first radio channel is a broadcast or multicast channel, and the second radio channel is a unicast channel.

8. The method of claim 1, wherein the first radio channel and the second radio channel are established over different physical channels, and the first radio channel is a first time slot of a first multi-slot time division multiple access, TDMA, radio channel, and the second radio channel is a second time slot of a second multi-slot TDMA radio channel.

9. The method of claim 1, wherein the first radio channel and the second radio channel are established over different logical channels, and the first radio channel is a long term evolution, LTE, multicast traffic channel, and the second radio channel is an LTE dedicated traffic channel.

10. The method of claim 1, wherein the first radio channel and the second radio channel are established over different physical channels, and the first radio channel is a first frequency of a multi-frequency frequency division multiple access, FDMA, system, and the second radio channel is a second frequency of the multi-frequency FDMA system.

11. The method of claim 1, wherein the step of requesting, by the target subscriber device, the identified media items comprises requesting, via a request transmitted over the second radio channel, the identified media items.

12. The method of claim 1, wherein the step of requesting, by the target subscriber device, the identified media items comprises requesting, via a request transmitted over a third radio channel, the identified media items, wherein the third radio channel is a stealing channel formed by stealing portions of the first radio channel.

13. The method of claim 1, wherein the determining, by the target subscriber device during a received call, that one or more identified media items in the stream of media items of the received call being received over a first radio channel was not successfully received further comprises determining that a threshold maximum number of identified media items has not been reached, wherein the threshold maximum number of identified media items equates to between three to five seconds of rendered media when rendered at the nominal rendering rate.

14. The method of claim 1 wherein the second radio channel is established at the time of establishment of the received call.

15. The method of claim 1, wherein the second radio channel is established responsive to the determining that the one or more identified media items was not successfully received.

16. A target subscriber device for achieving a lossless call, the target subscriber device comprising:
   one or more transceivers;
   one of a speaker and display;
   a data store; and
   one or more processors configured to:
      receive, via the one or more transceivers during a received call, media items in a stream of media items received over a first radio channel, and render, via the one of the speaker and display, the media items at a nominal rendering rate lower than a first increased relative rendering rate;
      determine, during the received call, that one or more identified media items in the stream of media items of the received call being received over the first radio channel via the one or more transceivers was not successfully received, and responsively:
         continue to receive, via the first radio channel and the one or more transceivers, first subsequent media items of the received call and buffer via the data store, and refrain from rendering via the one of the speaker and display, the first subsequent media items;
         request, via the one or more transceivers, the identified media items;
         receive, via the one or more transceivers and a second radio channel, different from the first radio channel and established at a time of the received call or responsive to the determining that the one or more identified media items was not successfully received, the identified media items;
         retrieve the buffered first subsequent media items via the data store and re-order the identified media items chronologically with respect to the buffered first subsequent media items to create a re-ordered subsequent media stream; and
         render, via the one of the speaker and display, the re-ordered subsequent media stream at the first increased relative rendering rate; and
      subsequently receive, via the first radio channel, second subsequent media items of the received call over the first radio channel via the one or more transceivers and render, via the one of the speaker and display, the second subsequent media items at the nominal rendering rate.

17. A method for achieving a lossless call over a wireless radio network, the method comprising:
   providing, by an infrastructure controller during a call, media items in a stream of media items via a first radio channel to a first target subscriber device;
   receiving, at the infrastructure controller during the call, a missed media items request from the first target subscriber device indicating one or more identified media items in the stream of media items of the call being provided over the first radio channel was not successfully received at the first target subscriber device, and responsively:
      continuing to receive, by the infrastructure controller, first subsequent media items of the call from a source device and buffering at the infrastructure controller, and not providing to the target subscriber device for rendering, the first subsequent media items;
      retrieving, by the infrastructure controller, from storage the identified media items identified in the missed media items request;
      re-ordering, by the infrastructure controller, the identified media items chronologically with respect to the buffered first subsequent media items to create a re-ordered subsequent media stream; and
      transmitting, by the infrastructure controller via a second radio channel, different from the first radio channel and established at a time of the call or on demand to provide the one or more identified media items, the re-ordered subsequent media stream to the target subscriber device for rendering; and
   subsequently providing, by the infrastructure controller via the first radio channel to the first target subscriber device for rendering, second subsequent media items of the call over the first radio channel.

* * * * *

UNITED STATES PATENT AND TRADEMARK OFFICE
CERTIFICATE OF CORRECTION

| | | |
|---|---|---|
| PATENT NO. | : 9,161,272 B2 | Page 1 of 1 |
| APPLICATION NO. | : 14/061904 | |
| DATED | : October 13, 2015 | |
| INVENTOR(S) | : Ofir et al. | |

It is certified that error appears in the above-identified patent and that said Letters Patent is hereby corrected as shown below:

IN THE TITLE PAGE:

Item (71), delete "MOTOROLA SOLUTIONS, INC," and insert -- MOTOROLA SOLUTIONS, INC., --, therefor.

Item (72), delete "Reshon Letzion" and insert -- Rishon LeZion --, therefor.

IN THE SPECIFICATION:

Column 1, Line 23, delete "terminal" and insert -- terminal. --, therefor.

Column 3, Line 45, delete "roof" and insert -- roof. --, therefor.

Column 8, Line 40, delete "thereof" and insert -- thereof. --, therefor.

Column 10, Line 45, delete "call" and insert -- call. --, therefor.

Column 12, Line 11, delete "source SD SD 12 and the target SD SD 42" and insert -- source SD 12 and the target SD 42 --, therefor.

Column 25, Lines 40-41, delete "requesting SD SD 12." and insert -- requesting SD 12. --, therefor.

Column 26, Line 22, delete "BS 30," and insert -- BS 40, --, therefor.

Signed and Sealed this
Sixteenth Day of August, 2016

Michelle K. Lee
*Director of the United States Patent and Trademark Office*